US012223883B2

(12) United States Patent
Yu et al.

(10) Patent No.: US 12,223,883 B2
(45) Date of Patent: Feb. 11, 2025

(54) DISPLAY DEVICE AND METHOD FOR DRIVING THE SAME

(71) Applicants: Samsung Display Co., LTD., Yongin-si (KR); IUCF-HYU (Industry-University Cooperation Foundation Hanyang University), Seoul (KR)

(72) Inventors: Byungchang Yu, Yongin-si (KR); Oh-Kyong Kwon, Seoul (KR); Kyunghoon Chung, Yongin-si (KR)

(73) Assignees: SAMSUNG DISPLAY CO., LTD., Gyeonggi-Do (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 18/139,113

(22) Filed: Apr. 25, 2023

(65) Prior Publication Data

US 2024/0021144 A1 Jan. 18, 2024

(30) Foreign Application Priority Data

Jul. 18, 2022 (KR) ........................ 10-2022-0087955

(51) Int. Cl.
*G09G 3/32* (2016.01)

(52) U.S. Cl.
CPC ....... *G09G 3/32* (2013.01); *G09G 2310/0267* (2013.01); *G09G 2320/0247* (2013.01); *G09G 2330/028* (2013.01)

(58) Field of Classification Search
CPC ... G09G 2300/0819; G09G 2300/0852; G09G 2300/0861; G09G 2310/0251;
(Continued)

(56) References Cited

U.S. PATENT DOCUMENTS 10,170,048 B2 1/2019 Lee et al.
11,386,844 B2 7/2022 Jeon et al.
(Continued)

FOREIGN PATENT DOCUMENTS

KR 101907962 B1 * 10/2018
KR 1020190047332 A 5/2019
(Continued)

OTHER PUBLICATIONS

Lin, J. Chang, p. Lai, L. Shih, S. Chen and M. Cheng, "Pixel Circuit With Leakage Prevention Scheme for Low-Frame-Rate AMOLED Displays," in IEEE Journal of the Electron Devices Society, vol. 8, pp. 235-240, 2020.
(Continued)

*Primary Examiner* — Kenneth Bukowski
(74) *Attorney, Agent, or Firm* — CANTOR COLBURN LLP

(57) ABSTRACT

A display device includes: a pixel including a light emitting element, a first capacitor connected between a first node and a second node, and a second capacitor connected between the second node and a third node. The pixel further includes: a first transistor connected between the second node and the light emitting element to operate depending on potential of the first node; a second transistor connected between the third node and a data line to operate depending on a first scan signal; a third transistor connected between the third node and the second transistor to operate depending on a light emitting control signal; a fourth transistor connected between a reference voltage line and a first node to operate depending on the second scan signal; and a fifth transistor connected between the reference voltage line and the third node to operate depending on a third scan signal.

27 Claims, 23 Drawing Sheets

(58) Field of Classification Search
CPC ... G09G 2310/0267; G09G 2320/0233; G09G 2320/0247; G09G 2330/028; G09G 3/32; G09G 3/3233
See application file for complete search history.

(56) References Cited

U.S. PATENT DOCUMENTS

| | | | | |
|---|---|---|---|---|
| 2014/0167009 | A1* | 6/2014 | Lee | H10K 59/00 257/40 |
| 2016/0148571 | A1* | 5/2016 | Cho | G09G 3/3266 345/212 |
| 2016/0379569 | A1* | 12/2016 | Lee | G09G 3/3258 345/77 |
| 2021/0049965 | A1* | 2/2021 | Jeon | G09G 3/3233 |

FOREIGN PATENT DOCUMENTS

| | | | |
|---|---|---|---|
| KR | 102023232 | B1 | 9/2019 |
| KR | 1020200067584 | A | 6/2020 |
| KR | 102185361 | B1 | 12/2020 |
| KR | 1020210019635 | A | 2/2021 |

OTHER PUBLICATIONS

N. Keum, S. Hong and O. Kwon, "An AMOLED Pixel Circuit With a Compensating Scheme for Variations in Subthreshold Slope and Threshold Voltage of Driving TFTs," in IEEE Journal of Solid-State Circuits, vol. 55, pp. 3087-3096, 2020.

S. M. Choi, O. K. Kwon, N. Komiya, and H. K. Chung, "A Self-compensated Voltage Programming Pixel Structure for Active-Matrix Organic Light Emitting Diodes" IDW Tech. Digest, 535-538 (2003).

* cited by examiner

DISPLAY DEVICE AND METHOD FOR DRIVING THE SAME

This application claims priority to Korean Patent Application No. 10-2022-0087955, filed on Jul. 18, 2022, and all the benefits accruing therefrom under 35 U.S.C. § 119, the content of which in its entirety is herein incorporated by reference.

BACKGROUND

Embodiments of the present disclosure described herein relate to a display device and a method for driving the same, and more particularly, relate to a display device capable of showing a uniform light emitting characteristic and a method for driving the same.

A light emitting display device among display devices displays an image by using a light emitting diode that generates a light through the recombination of electrons and holes. The light emitting display device has a rapid response speed and is driven with lower power consumption.

The light emitting display device includes pixels connected to data lines and scan lines. Each pixel typically includes a light emitting diode and a circuit unit to control an amount of current flowing through the light emitting diode. The circuit unit controls an amount of current, in response to a data signal, such that the current passes through the light emitting diode at a first driving voltage and flows at a second driving voltage. In this case, light having a specific brightness is generated to correspond to an amount of current flowing through the light emitting diode.

SUMMARY

Embodiments of the present disclosure provide a display device having display quality improved in an entire portion thereof by employing a pixel having a uniform light emitting characteristic even if an operating frequency is varied, and a method for driving the same.

According to an embodiment, a display device includes a display panel including a pixel, and a panel driver to drive the display panel. The pixel includes: a light emitting element; a first capacitor connected between a first node and a second node; and a second capacitor connected between the second node and a third node. The pixel further includes first to fifth transistors. The first transistor is connected between the second node and the light emitting element, to operate depending on potential of the first node. The second transistor connected between the third node and a data line, to operate depending on a first scan signal provided from the panel driver. The third transistor is connected between the third node and the second transistor, to operate depending on a first light emitting control signal provided from the panel driver. The fourth transistor is connected between a reference voltage line, which is to receive a reference voltage, and the first node, to operate depending on a second scan signal provided from the panel driver. The fifth transistor is connected between the reference voltage line and the third node, to operate depending on a third scan signal provided from the panel driver.

According to another embodiment, a display device includes a display panel including a pixel, and a panel driver to drive the display panel.

The pixel includes: a light emitting element; a first capacitor connected between a first node and a second node; and a second capacitor connected between the second node and a third node. The pixel further includes a first transistor, a second transistor, and a fourth transistor. The first transistor is connected between the second node and the light emitting element, to operate depending on potential of the first node. The second transistor is connected between the third node and a data line, to operate depending on a first scan signal provided from the panel driver. The fourth transistor is connected between a reference voltage line, which is to receive a reference voltage, and the first node, to operate depending on a second scan signal provided from the panel driver. The display panel displays an image during a plurality of frames, and at least one frame of the plurality of frames includes a write period and a holding period. The reference voltage has a reference level during the write period, and is varied to be in a level higher than the reference level within the holding period.

According to an embodiment, a display device includes: a display panel including a pixel connected to a reference voltage line, which is to receive a reference voltage, and a panel driver which drives the display panel during a plurality of frames. At least one frame of the plurality of frames includes a write period and a holding period. A method for operating the display device includes: applying, to the pixel, a scan signal having an activation level within a non-emission period of the write period, applying, to the pixel, a light emitting control signal having the activation level within an emission period of the write period, and deactivating the scan signal within the holding period, and applying the light emitting control signal to the pixel within the emission period of the holding period. The reference voltage has a reference level during the write period, and is varied to be in a level higher than the reference level within the holding period.

BRIEF DESCRIPTION OF THE FIGURES

The above and other aspects and features of the present disclosure will become apparent by describing in detail embodiments thereof with reference to the accompanying drawings.

DETAILED DESCRIPTION

Figure 1:
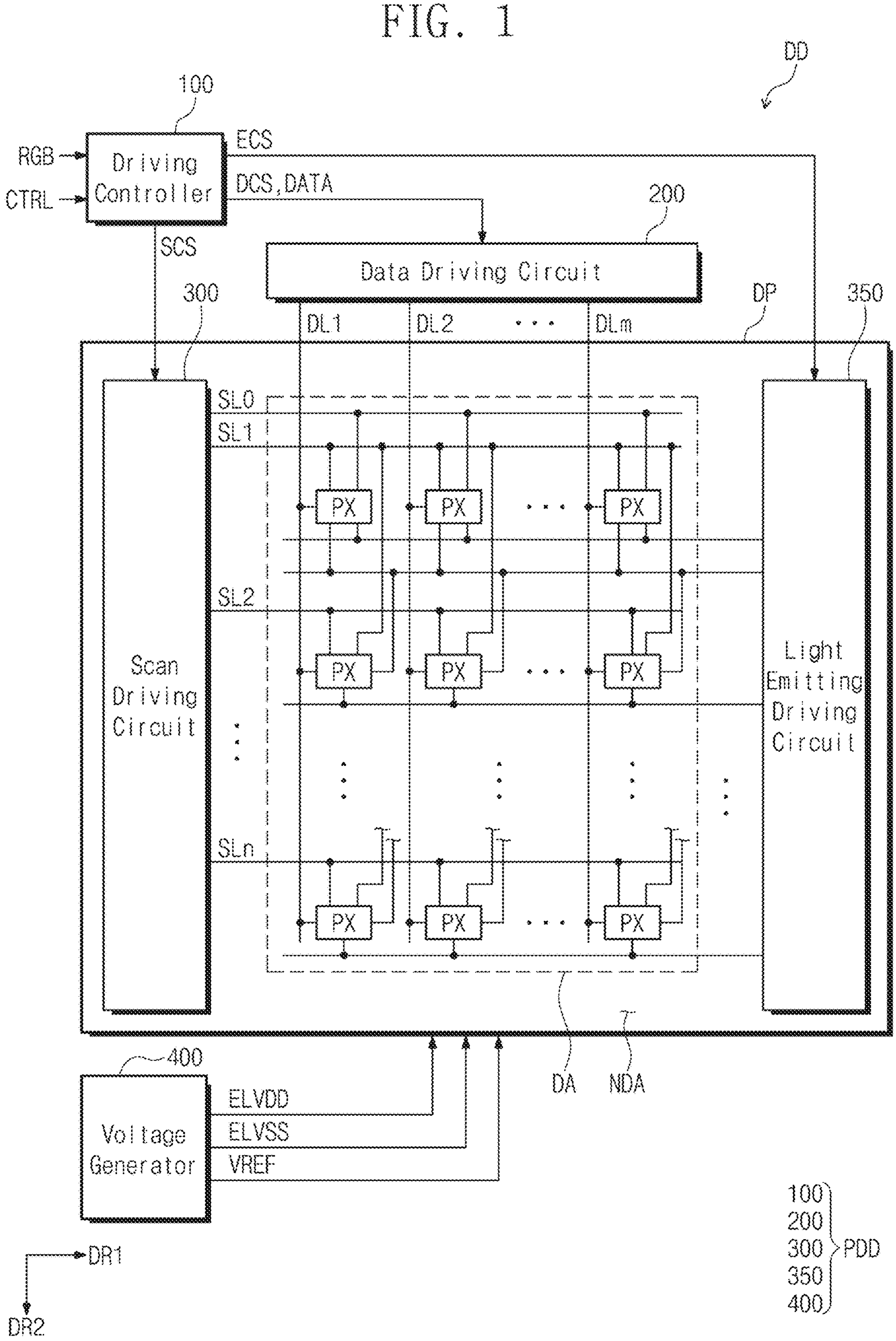
FIG. 1 is a block diagram of a display device according to an embodiment of the present disclosure.

In the specification, the expression that a first component (or area, layer, part, portion, etc.) is "on", "connected with", or "coupled to" a second component means that the first component is directly on, connected with, or coupled to the second component or means that a third component is interposed therebetween.

The same reference numeral refers to the same component. In addition, in drawings, thicknesses, proportions, and dimensions of components may be exaggerated to describe the technical features effectively. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The singular forms are intended to include the plural forms unless the context clearly indicates otherwise.

Also, the terms "under", "below", "on", "above", etc. are used to describe the correlation of components illustrated in drawings. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a block diagram of a display device according to an embodiment of the present disclosure.

Referring to FIG. 1, a display device DD may be a device activated in response to an electrical signal to display an image. The display device DD may be applied to an electronic device, such as a smart watch, a tablet PC, a laptop, a computer, or a smart television.

The display device DD includes a display panel DP, and a panel driver PDD to drive the display panel DP. According to an embodiment of the present disclosure, the panel driver PDD may include a driving controller 100, a data driving circuit 200, a scan driving circuit 300, a light emitting driving circuit 350, and a voltage generator 400.

The driving controller 100 receives an image signal RGB and a control signal CTRL. The driving controller 100 generates image data DATA by transforming a data format of the image signal RGB to be matched to the interface specification of the data driving circuit 200. The driving controller 100 outputs a scan control signal SCS, a data control signal DCS, and a light emitting driving signal ECS.

The data driving circuit 200 receives the data control signal DCS and the image data DATA from the driving controller 100. The data driving circuit 200 transforms the image data DATA into data signals and then outputs the data signals to a plurality of data lines DL1 to DLm to be described later. The data signals refer to analog voltages corresponding to grayscale values of the image data DATA.

The voltage generator 400 generates voltages for the operation of the display panel DP. According to an embodiment of the present disclosure, the voltage generator 400 generates a first driving voltage ELVDD, a second driving voltage ELVSS, and a reference voltage VREF. The reference voltage VREF may have a voltage level lower than a voltage level of the first driving voltage ELVDD. For example, the voltage generator 400 may variously change the voltage level of the reference voltage VREF for a specific duration (for example, a holding period), depending on an operating frequency of the display device DD.

The display panel DP includes scan lines SL0 to SLn, light emitting control lines EML0 to EMLn, the data lines DL1 to DLm, and pixels PX. The display panel DP may include a display region DA and a non-display region NDA. The scan lines SL0 to SLn, the light emitting control lines EML0 to EMLn, the data lines DL1 to DLm, and the pixels PX may be disposed in the display region DA. The scan lines SL0 to SLn extend in a first direction DR1, and are arranged while being spaced apart from each other in a second direction DR2. The light emitting control lines EML0 to EMLn extend in the first direction DR1, and are arranged while being spaced apart from each other in the second direction DR2. The data lines DL1 to DLm extend in the second direction DR2 and are arranged while being spaced apart from each other in the first direction DR1.

The scan driving circuit 300 and the light emitting driving circuit 350 may be disposed in the non-display region NDA of the display panel DP. According to an embodiment of the present disclosure, the scan driving circuit 300 is adjacent to one side of the display region DA, and the light emitting driving circuit 350 is adjacent to another side of the display region DA, which is opposite to the one side. According to an embodiment illustrated in FIG. 1, the scan driving circuit 300 and the light emitting driving circuit 350 are disposed at opposite sides of the display region DA, but the present disclosure is not limited thereto. The scan driving circuit 300 and the light emitting driving circuit 350 may be disposed to be adjacent to one of the one side and the another side of the display region DA. Alternatively, the scan driving circuit 300 and the light emitting driving circuit 350 may be integrally implemented into one circuit.

The plurality of pixels PX may be electrically connected to the scan lines SL0 to SLn, the light emitting control lines EML0 to EMLn, and the data lines DL1 to DLm, respectively. Each of the plurality of pixels PX may be electrically connected to two scan lines and two light emitting control lines. For example, as illustrated in FIG. 1, a first row of pixels PX may be connected to a dummy scan line SL0, a first scan line SL1, a dummy light emitting control line EML0, and a first light emitting control line EML1. Also, a second row of pixels PX may be connected to the first scan line SL1, a second scan line SL2, the first light emitting control line EML1, and a second light emitting control line EML2. However, the number of scan lines and light emitting control lines, which are connected to each pixel PX, is not limited thereto, but the number of scan lines and the number of light emitting control lines may be variable.

Each of the plurality of pixels PX includes a light emitting element ED (see FIG. 2) and a pixel circuit unit PXC (see FIG. 2) to control a light emitting operation of the light emitting element ED. The pixel circuit unit PXC may include at least one transistor and at least one capacitor. The scan driving circuit 300 and the light emitting driving circuit 350 may be directly formed in the non-display region NDA of the display panel DP, through the same process of forming the transistors of the pixel circuit unit PXC.

Each of the pixels PX receives the first driving voltage ELVDD, the second driving voltage ELVSS, and the reference voltage VREF from the voltage generator 400.

The scan driving circuit 300 receives the scan control signal SCS from the driving controller 100. The scan driving circuit 300 may output scan signals to the scan lines SL0 to SLn, in response to the scan control signal SCS. The light emitting driving circuit 350 may output the light emitting control signals to the light emitting control lines EML0 to EMLn, in response to the light emitting driving signal ECS from the driving controller 100.

According to an embodiment of the present disclosure, the driving controller 100 may determine the operating frequency, and may control the data driving circuit 200, the scan driving circuit 300, and the light emitting driving circuit 350, depending on the determined operating frequency. According to an embodiment of the present disclosure, the light emitting driving circuit 350 may operate at a frequency higher than or equal to that a frequency of the scan driving circuit 300. The voltage generator 400 may adjust (or change) the voltage level of the reference voltage VREF depending on the operating frequency of the scan driving circuit 300.

Figure 2:
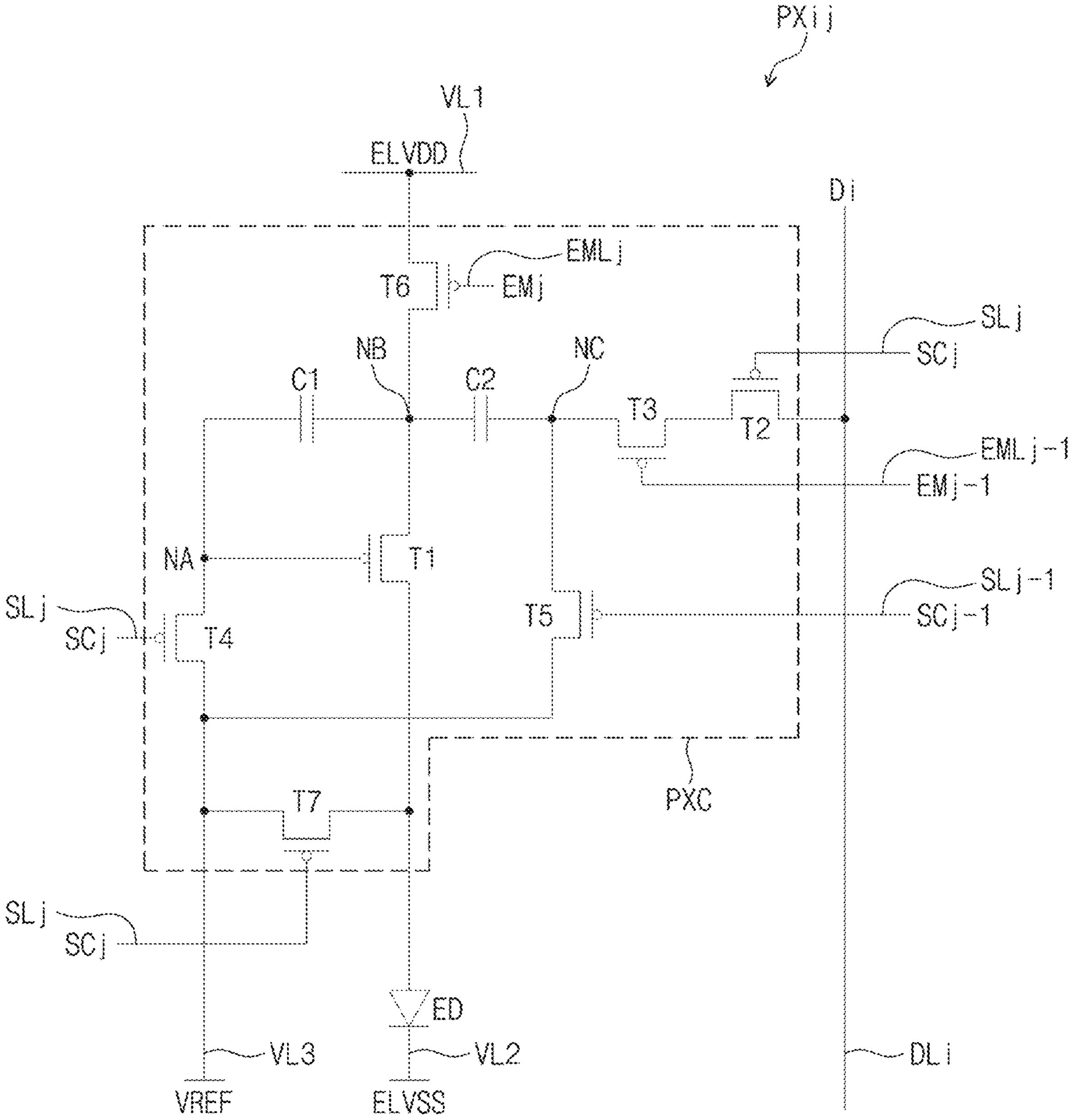
FIG. 2 is a circuit diagram of a pixel according to an embodiment of the present disclosure.

FIG. 2 is a circuit diagram of a pixel according to an embodiment of the present disclosure.

FIG. 2 illustrates an equivalent circuit diagram of a pixel PXij connected to an i-th data line DLi of the data lines DL1 to DLm, a (j−1)-th scan line SLj−1 and a j-th scan line SLj of the scan lines SL0 to SLn, a (j−1)-th light emitting control line EMLj−1 and a j-th light emitting control line EMLj of the light emitting control lines EML0 to EMLn. Each of the plurality of pixels PX illustrated in FIG. 1 has the same circuit configuration as the circuit configuration of the pixel PXij illustrated in FIG. 2. Accordingly, the details of remaining pixels except for the PXij will be omitted in the following description.

Referring to FIG. 2, the pixel PXij according to an embodiment includes the pixel circuit unit PXC and the light emitting element ED. According to an embodiment of the present disclosure, the pixel circuit unit PXC may include seven transistors and two capacitors. Hereinafter, the seven transistors are referred to as first to seventh transistors T1, T2, T3, T4, T5, T6, and T7, respectively, and two capacitors are referred to as first and second capacitors C1 and C2, respectively.

According to an embodiment, each of the first to seventh transistors T1 to T7 may be P-type transistors having a low-temperature polycrystalline silicon ("LTPS") semiconductor layer. Alternatively, each of the first to seventh transistors T1 to T7 may be an N-type transistor. In addition, at least one of the first to seventh transistors T1 to T7 may be an N-type transistor, and the remaining transistors may be P-type transistors. In addition, at least one of the first to seventh transistors T1 to T7 may be a transistor having an oxide semiconductor layer. For example, some of the first to seventh transistors T1 to T7 may be oxide semiconductor transistors, and remaining transistors may be an LTPS transistor.

According to the present disclosure, the circuit configuration of the pixel PXij is not limited to the circuit configuration illustrated in FIG. 2. The pixel PXij illustrated in FIG. 2 is provided only for the illustrative purpose, and the circuit configuration of the pixel PXij may be modified and implemented.

The (j−1)-th scan line SLj−1 and the j-th scan line SLj supply a (j−1)-th scan signal SCj−1 and a j-th scan signal SCj to the pixel PXij, and the (j−1)-th light emitting control line EMLj−1 and the j-th light emitting control line EMLj supply a (j−1)-th light emitting control signal EMj−1 and a j-th light emitting control signal EMj to the pixel PXij. The i-th data line DLi transmits an i-th data signal Di to the pixel PXij. The i-th data signal Di may have a voltage level corresponding to the image signal RGB input into the display device DD (see FIG. 1).

The pixel PXij may be connected to a first voltage line VL1, a second voltage line VL2, and a reference voltage line VL3. The first voltage line VL1 transmits the first driving voltage ELVDD, which is supplied from the voltage generator 400 illustrated in FIG. 1, to the pixel PXij, and the second voltage line VL2 transmits the second driving voltage ELVSS, which is supplied from the voltage generator 400, to the pixel Pxij. The reference voltage line VL3 may transmit the reference voltage VREF supplied from the voltage generator 400 to the pixel Pxij.

The first capacitor C1 is connected between a first node NA and a second node NB, and the second capacitor C2 is connected between the second node NB and a third node NC.

The first transistor T1 is connected between the second node NB and the light emitting element ED and may operate depending on the potential difference between the first node NA and the second node NB. The first transistor T1 includes a first electrode connected to the second node NB, a second electrode connected to an anode of the light emitting element ED, and a gate electrode connected to the first node NA. The first transistor T1 operates depending on the potential of the first node NA to electrically connect the second node NB to the anode of the light emitting element ED.

The second transistor T2 is connected between the third transistor T3 and the i-th data line Dli and receives a first scan signal. The second transistor T2 includes a first electrode connected to the i-th data line Dli, a second electrode connected to the third node NC via the third transistor T3, and a gate electrode to receive the first scan signal. According to an embodiment of the present disclosure, the gate electrode of the second transistor T2 may be connected to the j-th scan line SLj to receive the j-th scan signal SCj serving as the first scan signal. The second transistor T2 is turned on in response to the first scan signal, and outputs the i-th data signal Di supplied through the i-th data line Dli to the third transistor T3.

The third transistor T3 is connected between the third node NC and the second transistor T2 to receive the first light emitting control signal. The third transistor T3 includes a first electrode connected to the second electrode of the second transistor T2, a second electrode connected to the third node NC, and a gate electrode to receive the first light emitting control signal. According to an embodiment of the present disclosure, the gate electrode of the third transistor T3 may be connected to the (j−1)-th light emitting control line EMLj−1 to receive the (j−1)-th light emitting control signal Emj−1 serving as the first light emitting control signal. The third transistor T3 is turned on in response to the first light emitting control signal and transmits the i-th data signal Di output from the second transistor T2 to the third node NC.

The fourth transistor T4 is connected between the reference voltage line VL3 to receive the reference voltage VREF and the first node NA, and receives a second scan signal (or a write scan signal). The fourth transistor T4 includes a first electrode connected to the first node NA, a second electrode connected to the reference voltage line VL3, and a gate electrode to receive the second scan signal. According to an embodiment of the present disclosure, the gate electrode of the fourth transistor T4 may be connected to the j-th scan line SLj to receive the j-th scan signal SCj serving as the second scan signal. The fourth transistor T4 electrically connects the first node NA to the reference voltage line VL3 in response to the second scan signal.

The fifth transistor T5 is connected between the reference voltage line VL3 and the third node NC and receives a third scan signal. The fifth transistor T5 includes a first electrode connected to the third node NC, a second electrode connected to the reference voltage line VL3, and a gate electrode to receive the third scan signal. According to an embodiment of the present disclosure, the gate electrode of the fifth transistor T5 may be connected to the (j−1)-th scan line SLj−1 to receive the (j−1)-th scan signal SCj−1 serving as the third scan signal. The fifth transistor T5 electrically connects the third node NC to the reference voltage line VL3 in response to the third scan signal.

The sixth transistor T6 is connected between the first voltage line VL1 to receive the first driving voltage ELVDD and the second node NB to receive the second light emitting control signal. The sixth transistor T6 includes a first electrode connected to the first voltage line VL1, a second electrode connected to the second node NB, and a gate electrode to receive the second light emitting control signal. The gate electrode of the sixth transistor T6 may be connected to the j-th light emitting control line EMLj to receive the j-th light emitting control signal Emj serving as the second light emitting control signal. The sixth transistor T6 electrically connects the second node NB to the first voltage line VL1in response to the second light emitting control signal.

The seventh transistor T7 is connected between the reference voltage line VL3 and the light emitting element ED to receive a fourth scan signal. The seventh transistor T7 includes a first electrode connected to the light emitting element ED, a second electrode connected to the reference voltage line VL3, and a gate electrode to receive the fourth scan signal. According to an embodiment of the present disclosure, the gate electrode of the seventh transistor T7 may be connected to the j-th scan line SLj to receive the j-th scan signal SCj serving as the fourth scan signal. The seventh transistor T7 electrically connects the anode of the light emitting element ED and the reference voltage line VL3 in response to the fourth scan signal. According to an embodiment of the present disclosure, the first scan signal, the second scan signal and the fourth scan signal may be the same signals. In addition, the third scan signal may be a signal activated earlier than the first scan signal, the second scan signal, and the fourth scan signal.

The light emitting element ED is connected between the second voltage line VL2 to receive the second driving voltage ELVSS and the first transistor T1. The anode of the light emitting element ED is connected to the second electrode of the first transistor T1 and the cathode of the light emitting element ED is connected to the second voltage line VL2.

Figure 3A:
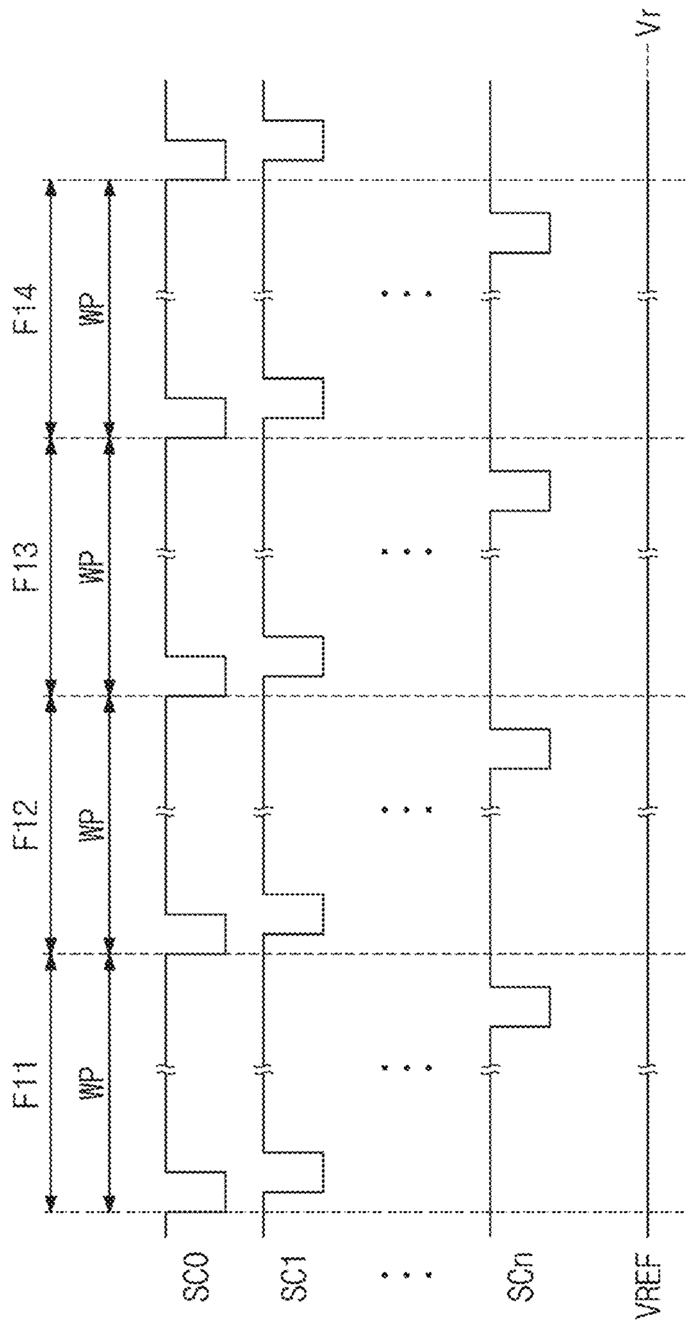
FIGS. 3A, 3B, and 3C are timing diagrams illustrating the operation of a display device according to an embodiment of the present disclosure.
Figure 3B:
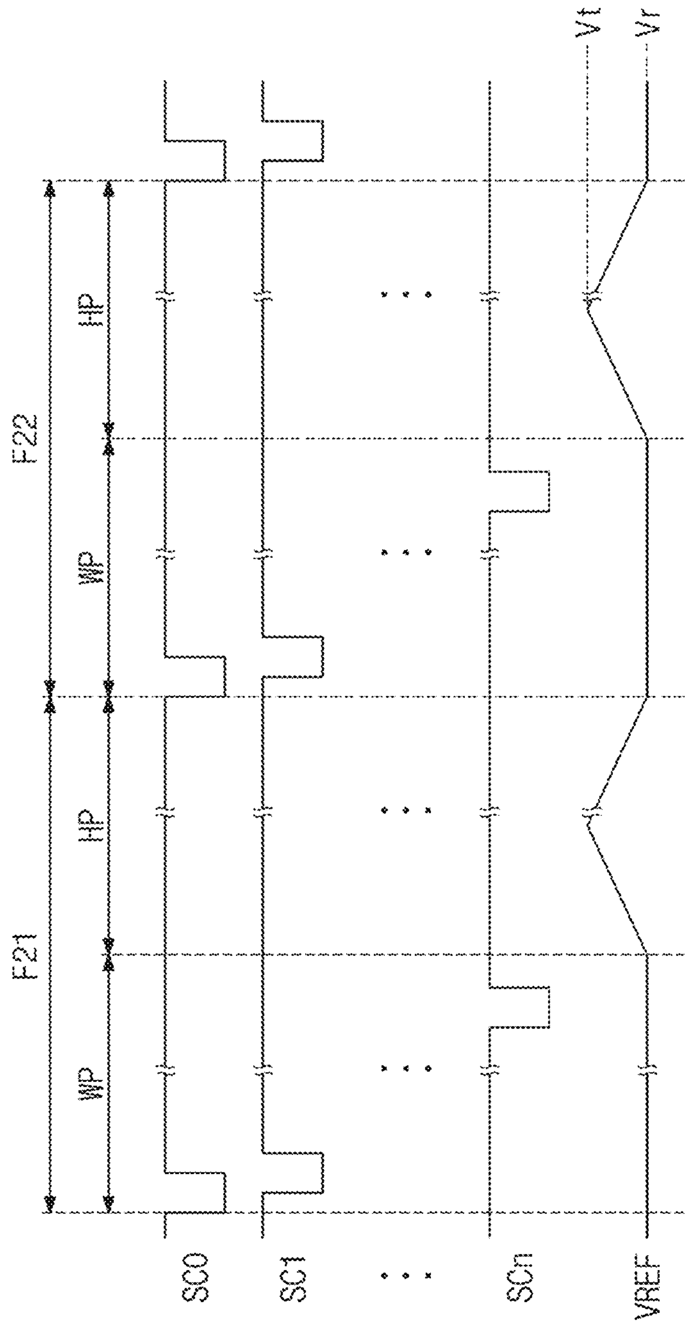
Figure 3C:
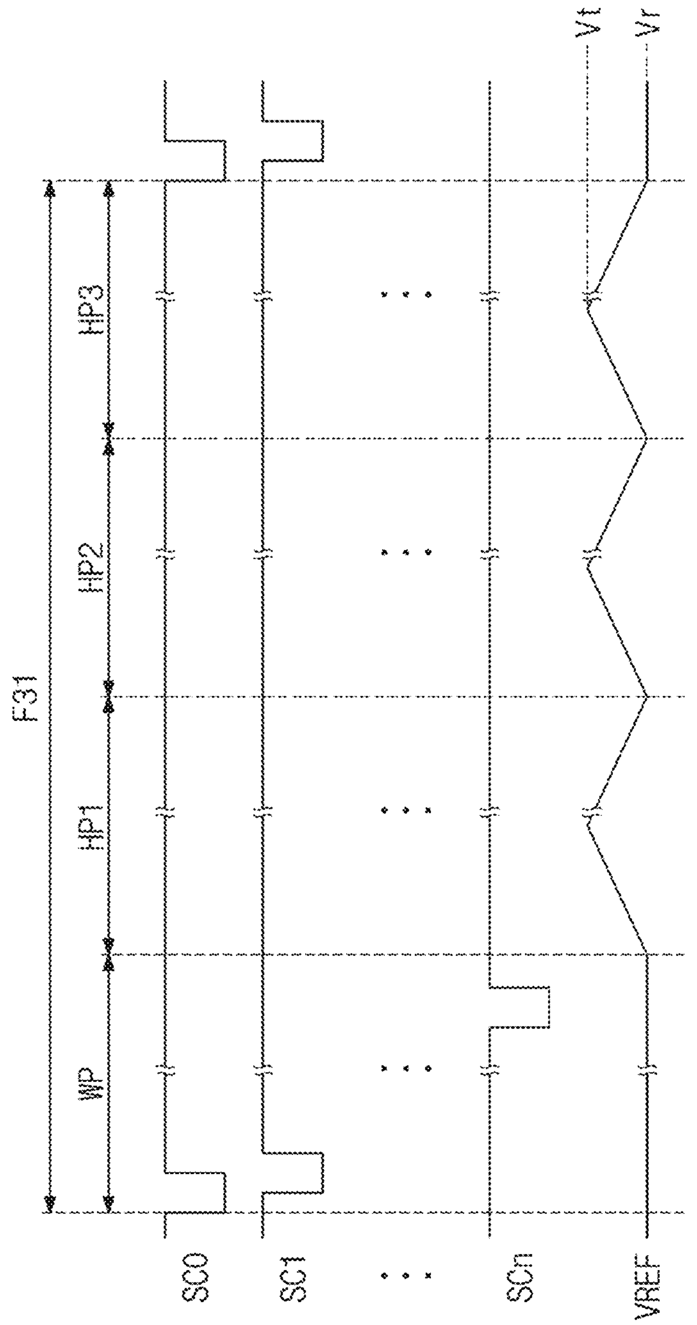

FIG. 3A is a timing diagram illustrating that a display device operates at a first operating frequency according to an embodiment of the present disclosure. FIG. 3B is a timing diagram illustrating that a display device operates at a second operating frequency according to an embodiment of the present disclosure. FIG. 3C is a timing diagram illustrating that a display device operates at a third operating frequency according to an embodiment of the present disclosure.

Referring to FIGS. 1 to 3A, the operating frequency of the display device DD may be variously changed. According to an embodiment of the present disclosure, the first operating frequency may be the highest operating frequency at which the display device DD operates. For example, the first operating frequency may be 240 HZ. The first operating frequency may be referred to a reference frequency or the maximum frequency.

When the display device DD operates at the first operating frequency, the scan driving circuit 300 may sequentially activate the scan signals SC0 to SCn to be at a low level, during a plurality of frames F11, F12, F13, and F14.

When the display device DD operates at the first operating frequency, the reference voltage VREF may be maintained at a constant voltage level (e.g., a reference level Vr) during the plurality of frames F11, F12, F13, and F14. When the first operating frequency is the maximum frequency, each of the frames F11, F12, F13, and F14 may include only a write period WP. In this case, the duration of the write period WP may be equal to the duration of each of the frames F11, F12, F13, and F14.

Referring to FIGS. 1 to 3B, the display device DD may operate at the second operating frequency lower than the first operating frequency. According to an embodiment of the present disclosure, although the following description is made regarding the second operating frequency of 120 Hz, but the second operating frequency is not limited thereto. The operating frequency of the display device DD may be variously changed. According to an embodiment, the operating frequency of the display device DD may be determined depending on the characteristic (e.g., a moving picture or a still image) of the image signal RGB.

When the display device DD operates at the second operating frequency lower than the first operating frequency, the duration of each of the frames F21 and F22 may be longer than the duration of each of the frames F11, F12, F13, and F14 illustrated in FIG. 3A. According to an embodiment of the present disclosure, the duration of each of the frames F21 and F22 may be twice the duration of each of the frames F11, F12, F13, and F14. Each of the frames F21 and F22 may include a write period WP and a holding period HP. The write period WP may have the duration equal to the duration of each of the frames F11, F12, F13, and F14 illustrated in FIG. 3A.

The scan driving circuit 300 may sequentially activate the scan signals SC0 to SCn to be at an activation level (e.g., a low level) during the write period WP. Although not illustrated in FIG. 3B, the light emitting driving circuit 350 may sequentially activate the light emitting control signals to be at the activation level (for example, the low level) during the write period WP.

The scan driving circuit 300 maintains the scan signals SC0 to SCn at a deactivation level (e.g., a high level) during the holding period HP. Although not illustrated in FIG. 3B, the light emitting driving circuit 350 may sequentially activate the light emitting control signals to be at the activation level (for example, the low level) during the holding period HP. In other words, even if the operating frequency of the display device DD is changed to the second operating frequency, the light emitting control signals may still be output at the first operating frequency.

When the display device DD operates at the second operating frequency, the reference voltage VREF may be maintained at a constant voltage level (e.g., the reference level Vr) during the write period WP. The reference voltage VREF may be varied instead of being maintained at the reference level Vr, during the holding period HP. According to an embodiment of the present disclosure, the reference voltage VREF may be varied to a higher level than the reference level Vr, during the holding period HP. The reference voltage VREF may be varied between the reference level Vr and a preset target level Vt. According to an embodiment of the present disclosure, the target level Vt may be higher than the reference level Vr, and may be equal to or lower than the voltage level of the first driving voltage ELVDD.

Referring to FIGS. 1 to 3C, the display device DD may operate at the third operating frequency lower than both the first operating frequency and the second operating frequency. According to an embodiment of the present disclosure, although the following description is made regarding the third operating frequency of 60 Hz, but the third operating frequency is not limited thereto.

When the display device DD operates at the third operating frequency, the duration of a frame F31 may be longer than the duration of each of the frames F11, F12, F13, and F14 illustrated in FIG. 3A. According to an embodiment of the present disclosure, the duration of the frame F31 may be four times the duration of each of the frames F11, F12, F13, and F14. The frame F31 may include the write period WP and a plurality of holding periods (for example, first to third hold frames HP1 to HP3). The write period WP may have the duration equal to the duration of each of the frames F11, F12, F13, and F14 illustrated in FIG. 3A.

The scan driving circuit 300 may sequentially activate the scan signals SC0 to SCn to be at the activation level (e.g., the low level) during the write period WP. Although not illustrated in FIG. 3C, the light emitting driving circuit 350 may sequentially activate the light emitting control signals to be at the activation level (for example, the low level) during the write period WP.

The scan driving circuit 300 maintains the scan signals SC0 to SCn at a deactivation level (e.g., a high level) during the first holding period HP1 to the third holding period HP3. Although not illustrated in FIG. 3C, the light emitting driving circuit 350 may sequentially activate the light emitting control signals to be at the activation level (for example, the low level) during the first holding period HP1 to the third holding period HP3. In other words, even if the operating frequency of the display device DD is varied to the third operating frequency, the light emitting control signals may still be output at the first operating frequency.

When the display device DD operates at the third operating frequency, the reference voltage VREF may be maintained at the constant voltage level (e.g., the reference level Vr) during the write period WP. The reference voltage VREF may be varied, instead of being maintained at the reference level Vr, during the first holding period HP1 to the third holding period HP3. According to an embodiment of the present disclosure, the reference voltage VREF may be varied to be at a higher level than the reference level Vr, for the durations of the first holding period HP1 to the third holding period HP3. The reference voltage VREF may be varied between the reference level Vr and the preset target level Vt. According to an embodiment of the present disclosure, the target level Vt may be higher than the reference level Vr, and may be equal to or lower than the voltage level of the first driving voltage ELVDD.

Figure 4A:
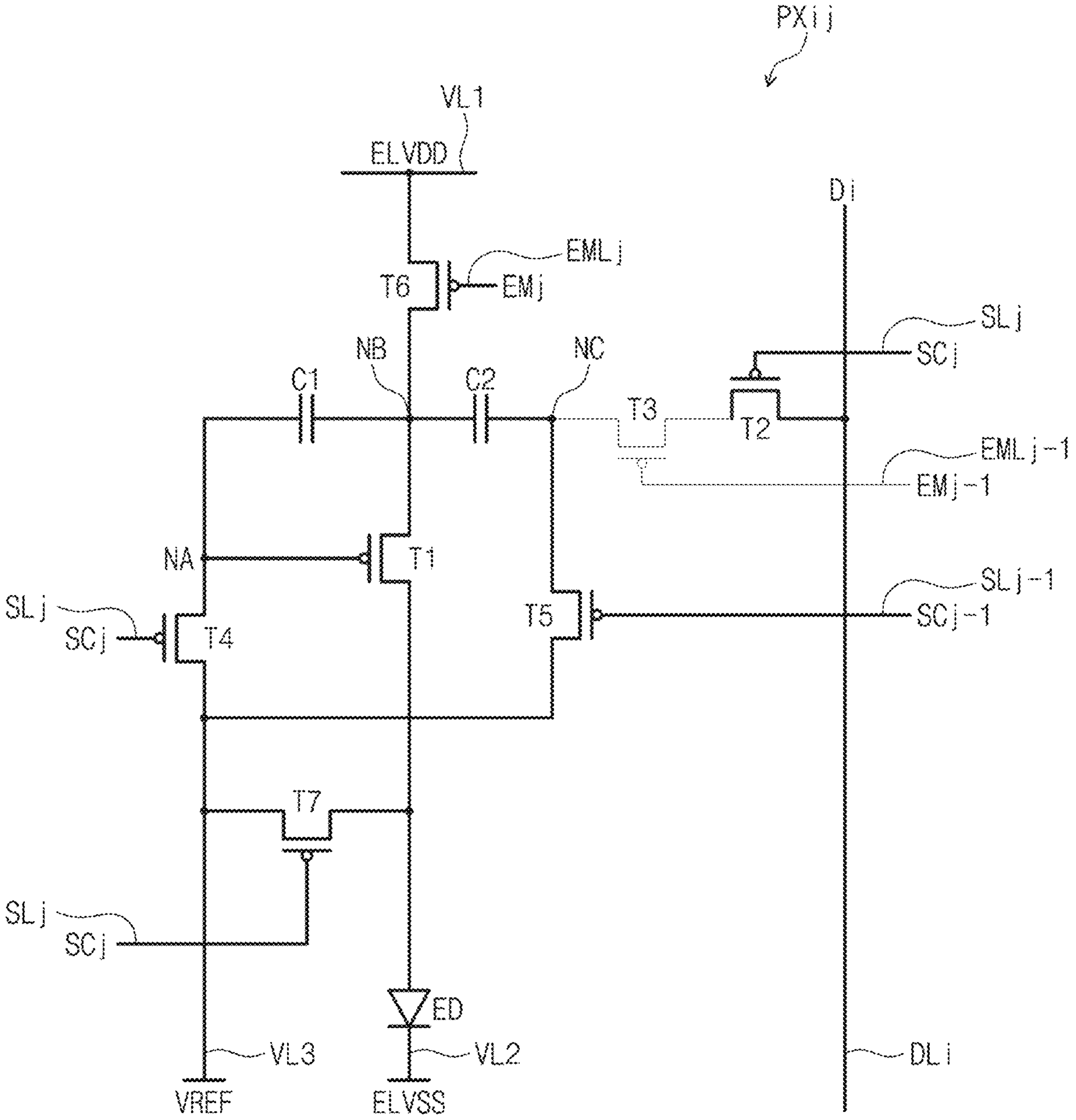
FIGS. 4A and 4B are views illustrating an operation of a pixel for a first period according to an embodiment of the present disclosure.
Figure 4B:
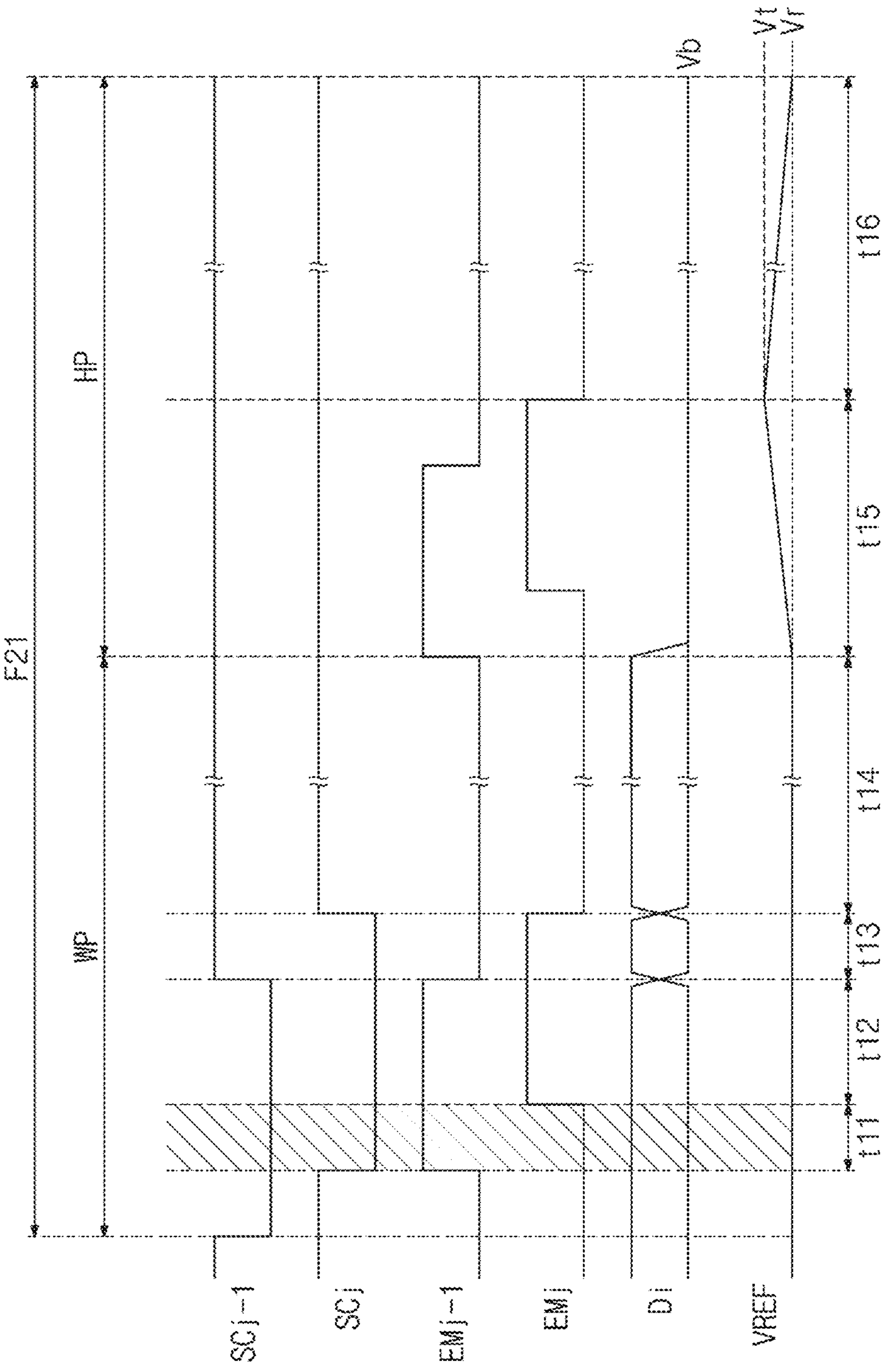
Figure 5A:
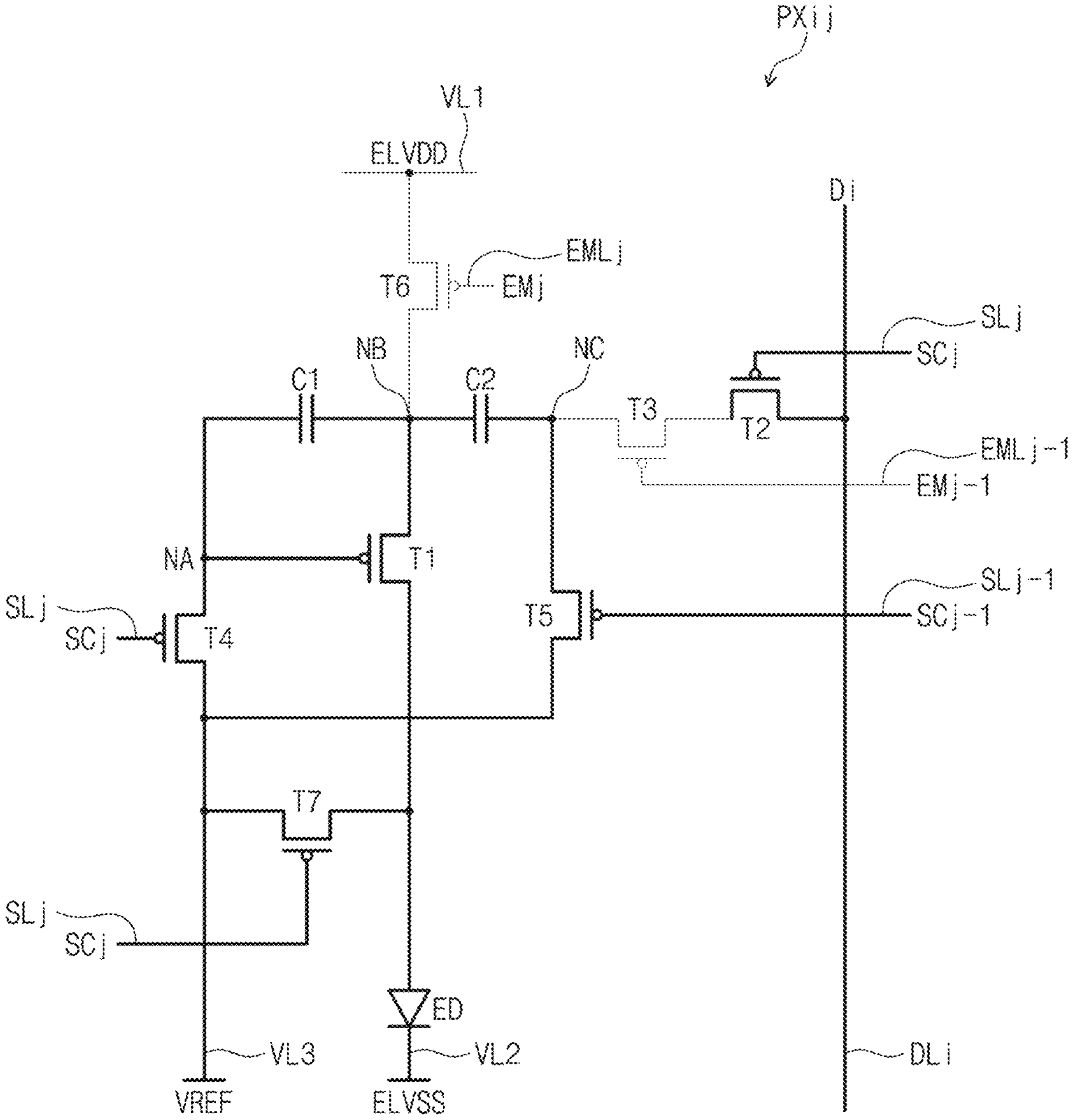
FIGS. 5A and 5B are views illustrating an operation of a pixel for a second period according to an embodiment of the present disclosure.
Figure 5B:
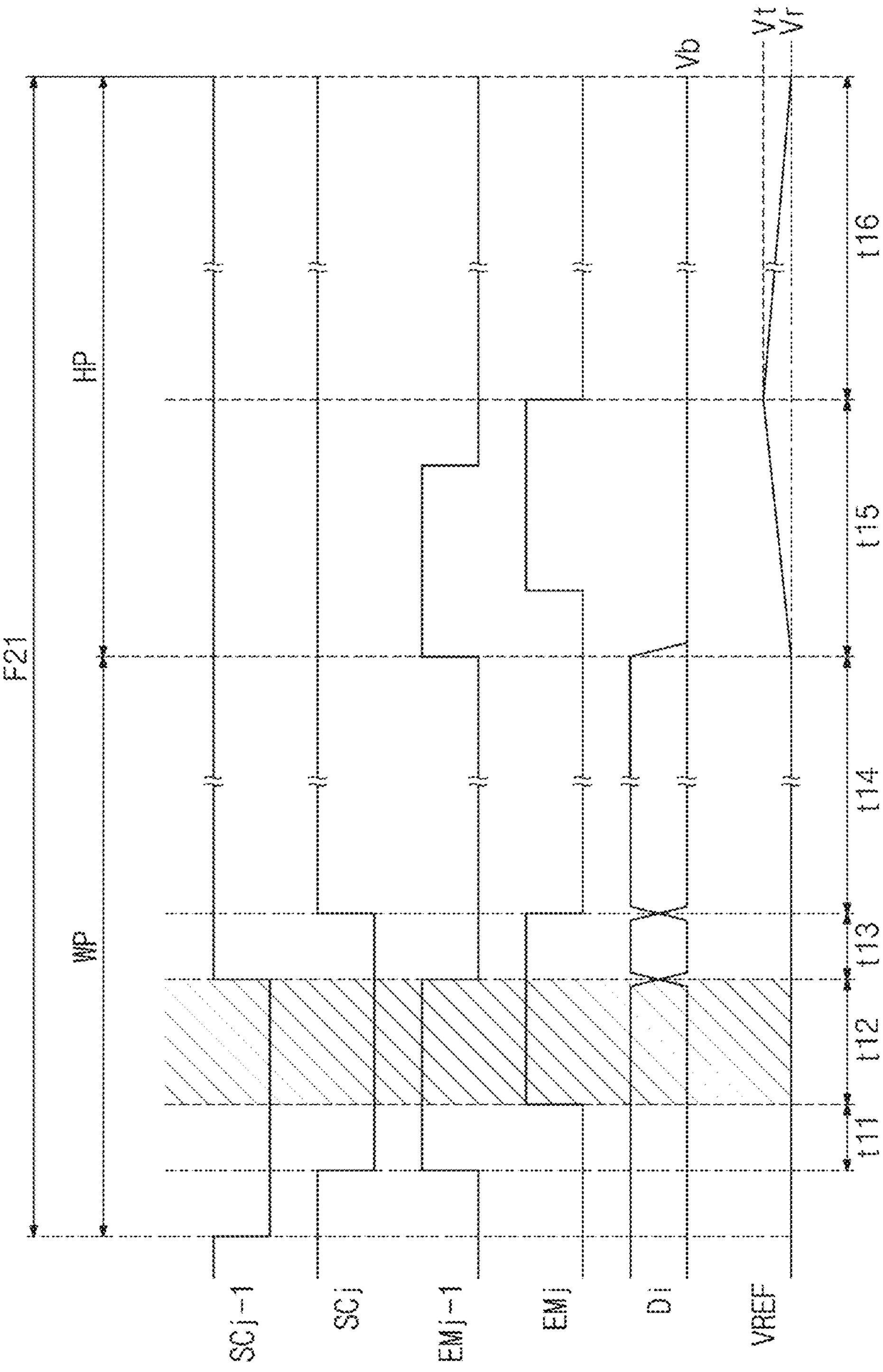
Figure 6A:
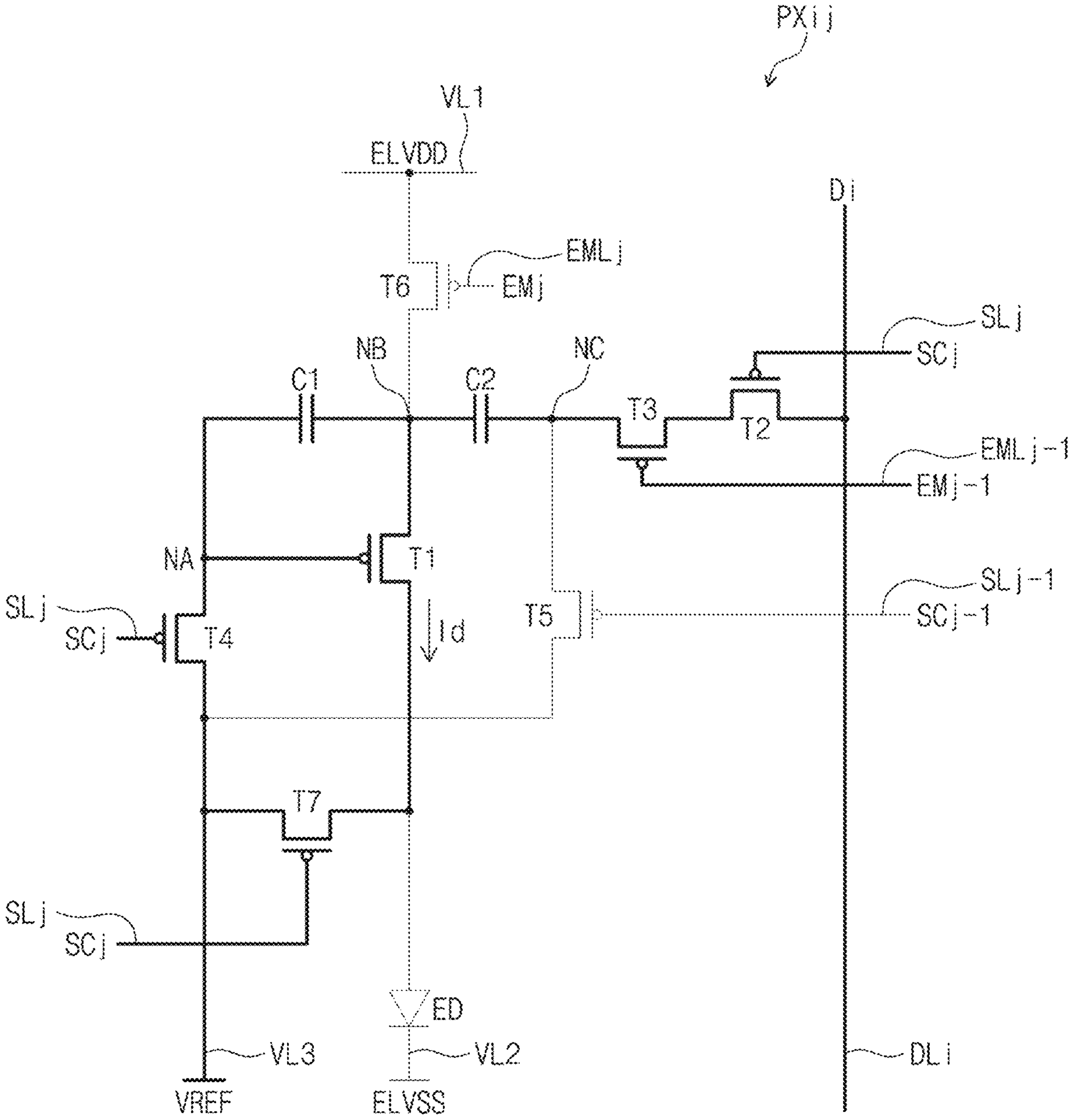
FIGS. 6A to 6C are views illustrating an operation of a pixel for a third period according to an embodiment of the present disclosure.
Figure 6B:
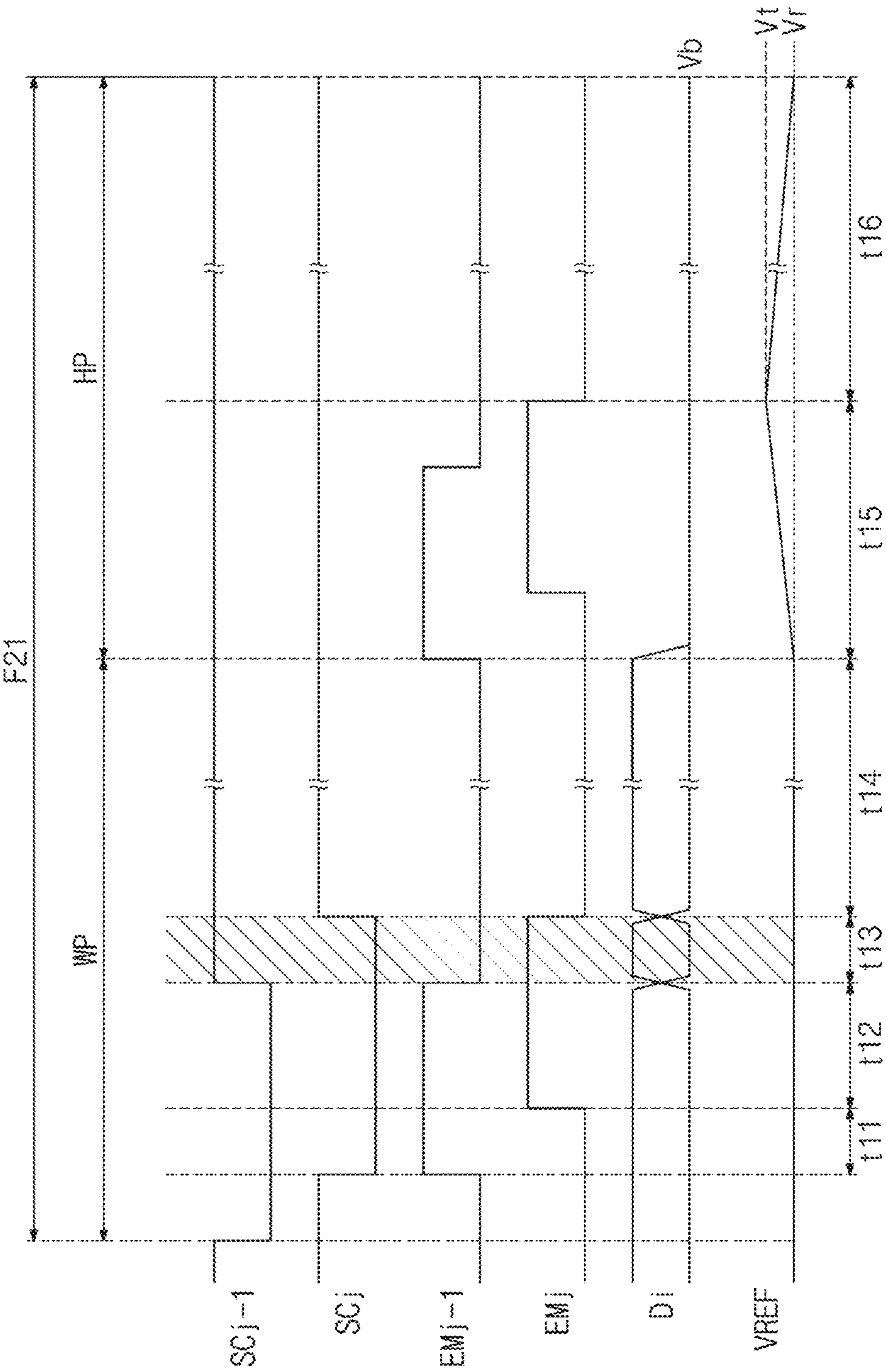
Figure 6C:
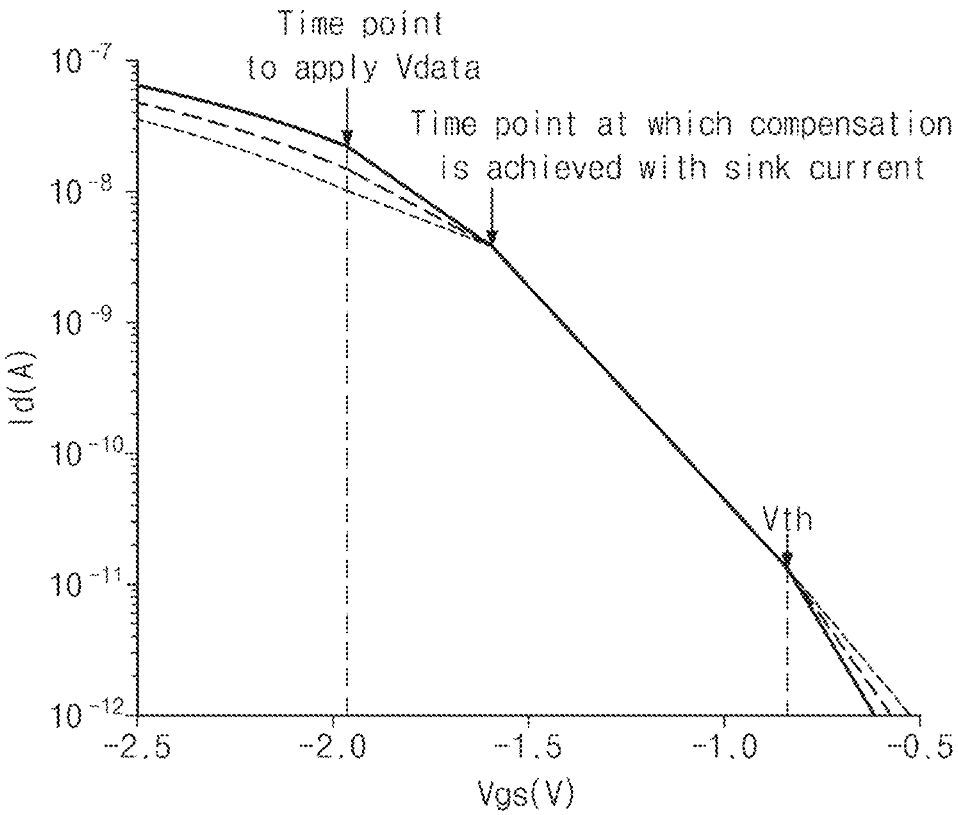
Figure 7A:
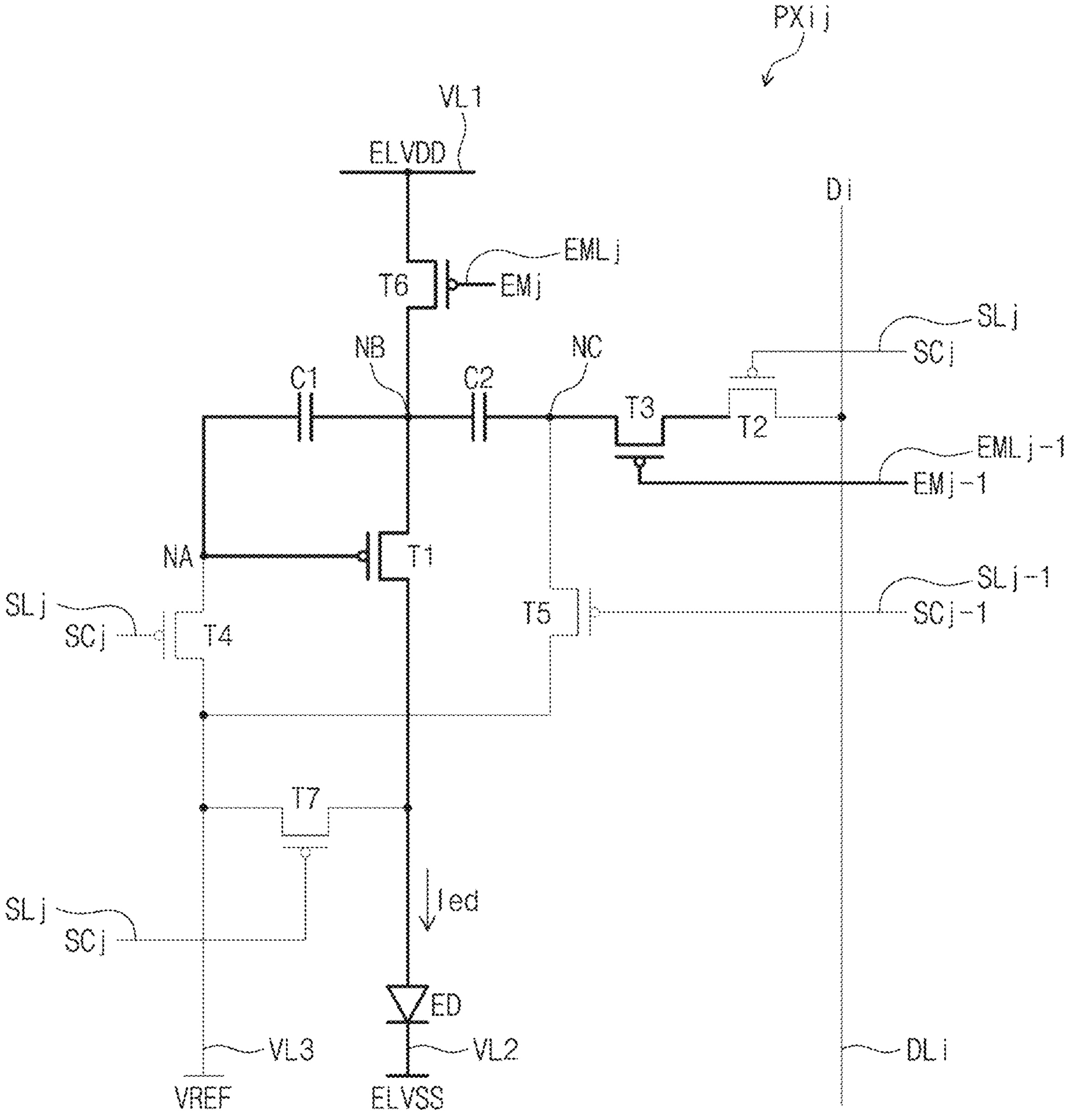
FIGS. 7A and 7B are views illustrating an operation of a pixel for fourth and sixth periods according to an embodiment of the present disclosure.
Figure 7B:
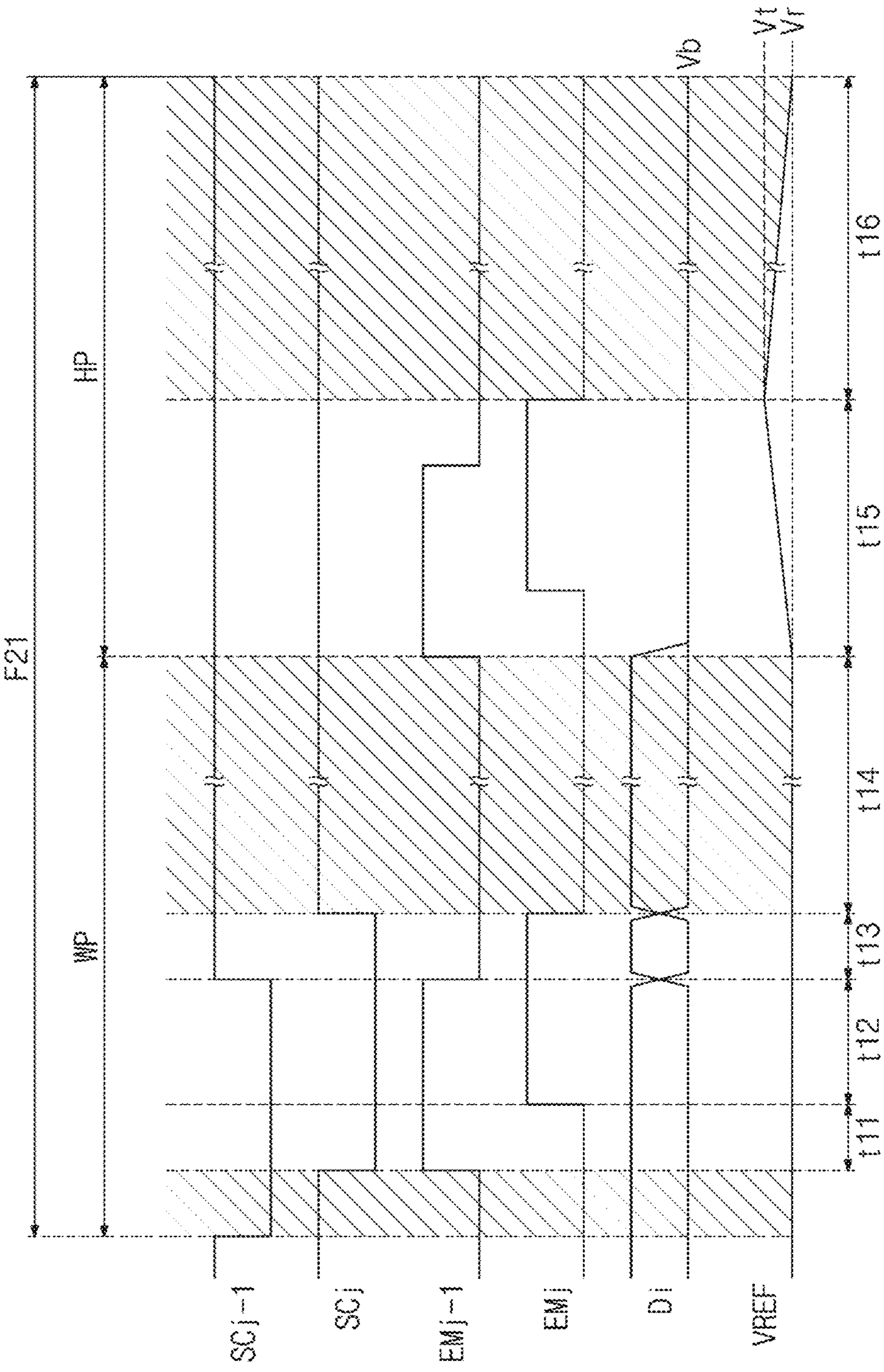
Figure 8A:
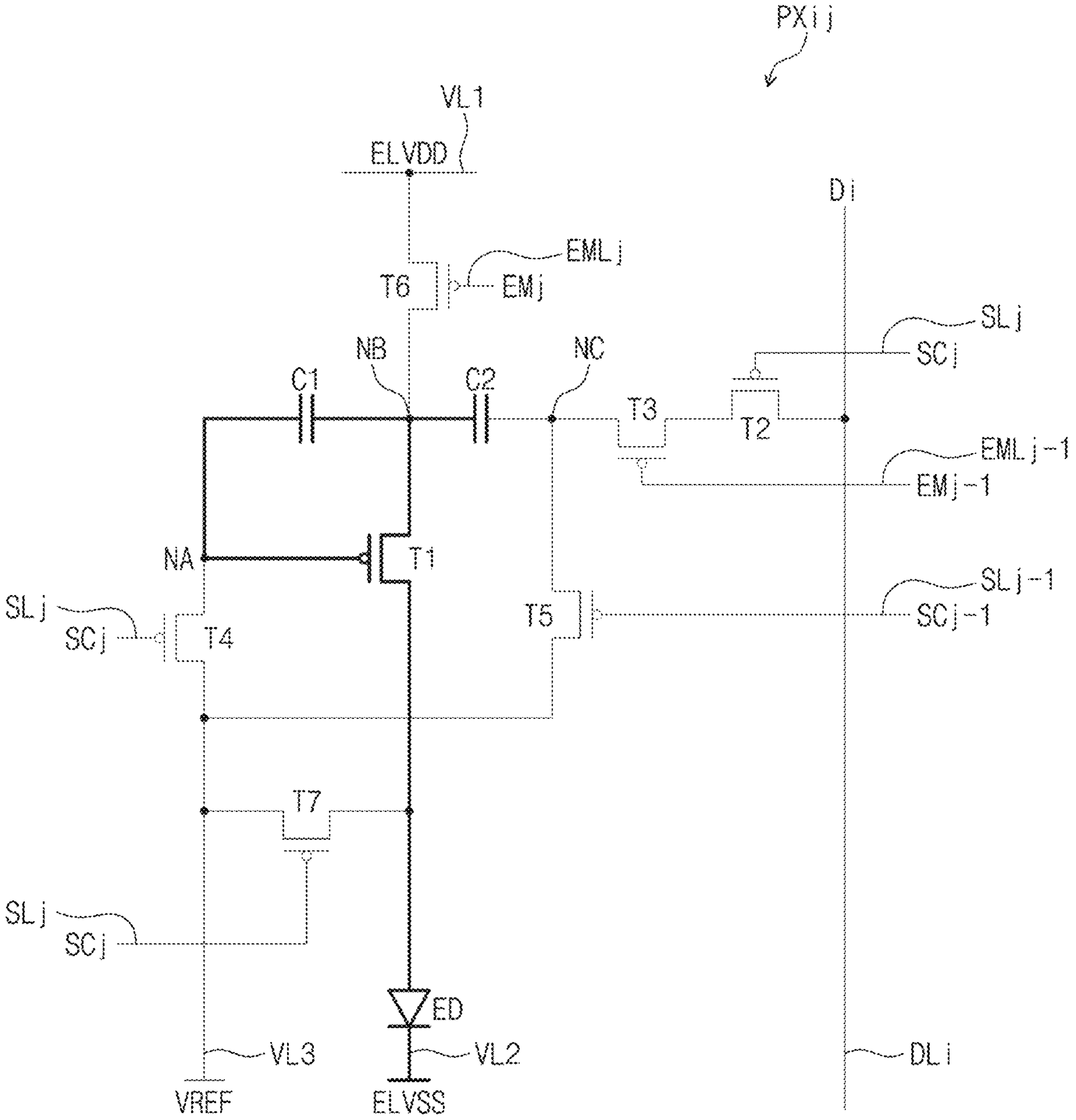
FIGS. 8A and 8B are views illustrating an operation of a pixel for a fifth period according to an embodiment of the present disclosure.
Figure 8B:
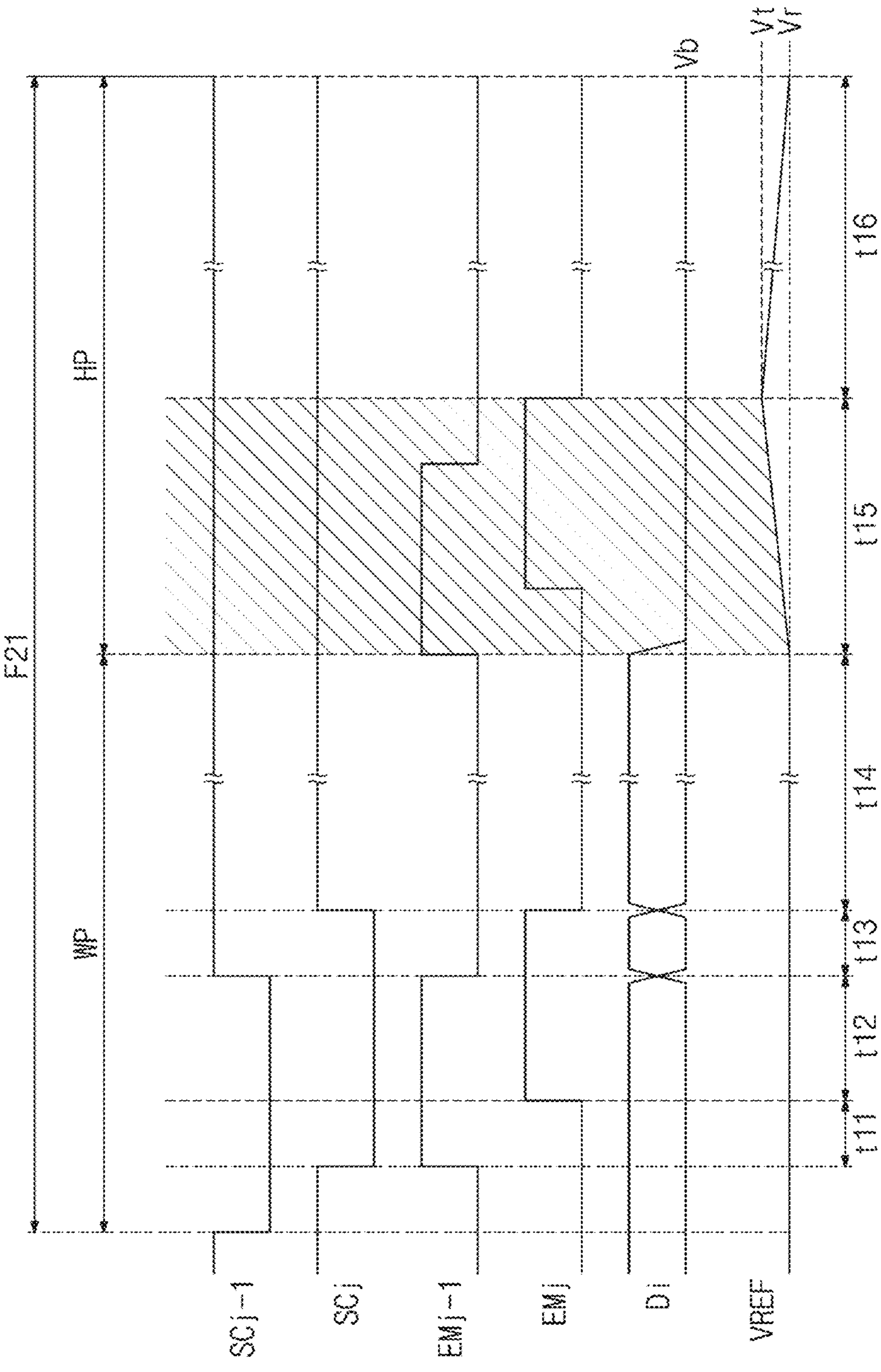

FIGS. 4A and 4B are views illustrating an operation of a pixel for a first duration according to an embodiment of the present disclosure. FIGS. 5A and 5B are views illustrating an operation of a pixel for a second duration according to an embodiment of the present disclosure. FIGS. 6A to 6C are views illustrating an operation of a pixel for a third duration according to an embodiment of the present disclosure. FIGS. 7A and 7B are views illustrating an operation of a pixel for fourth and sixth durations according to an embodiment of the present disclosure, and FIGS. 8A and 8B are views illustrating an operation of a pixel for a fifth duration according to an embodiment of the present disclosure.

Although FIGS. 4B, 5B, 6B, 7B, and 8B illustrate the operation of a pixel during the frame F21 in illustrated in FIG. 3B, the present disclosure is not limited thereto.

As illustrated in FIGS. 4B, 5B, 6B, and 7B, one frame F21 includes a write period WP and a holding period HP. The write period WP includes first to fourth periods of t11 to t14, and the holding period HP includes fifth and sixth periods t15 and t16.

Referring to FIGS. 4A and 4B, the (j−1)-th scan signal SCj−1 and the j-th scan signal SCj have activation levels, for the first period t11 of the write period WP. Accordingly, the fifth transistor T5 is turned on in response to the (j−1)-th scan signal SCj−1 for the first period t11, and the second, fourth, and seventh transistors T2, T4, and T7 are turned on in response to the j-th scan signal SCj. The (j−1)-th scan signal SCj−1 (i.e., the third scan signal) may be activated earlier than the j-th scan signal SCj (i.e., the first, second, and fourth scan signals) by the duration of the first period tn.

For the first period t11 of the write period WP, the (j−1)-th light emitting control signal Emj−1 has a deactivation level, and the j-th light emitting control signal Emj has an activation level. Accordingly, the third transistor T3 is turned off in response to the (j−1)-th light emitting control signal Emj−1 for the first period t11, and the sixth transistor T6 is turned on in response to the j-th light emitting control signal Emj. The (j−1)-th light emitting control signal Emj−1 (i.e., the first light emitting control signal) may be deactivated earlier than the j-th light emitting control signal Emj (i.e., the second light emitting control signal) by a duration of the first period t11. The reference voltage VREF is applied to the first node NA through the fourth transistor T4 turned on, and is applied to the anode of the light emitting element ED through the seventh transistor T7 turned on. The reference voltage VREF is applied to the third node NC through the fifth transistor T5 turned on. The first driving voltage ELVDD is applied to the second node NB through the sixth transistor T6 turned on. In other words, the first period t11 may be an initialization period in which the first node NA, the anode of the light emitting element ED, and the third node NC are initialized to the reference voltage VREF.

Referring to FIGS. 5A and 5B, the (j−1)-th scan signal SCj−1 and the j-th scan signal SCj have activation levels, for a second period t12 of the write period WP. Accordingly, the second, fourth, fifth, and seventh transistors T2, T4, T5, and T7 are maintained in a turn-on state for the second period t12. For the second period t12 of the write period WP, the (j−1)-th light emitting control signal Emj−1 and the j-th light emitting control signal Emj have deactivation levels. Accordingly, for the second period t12, the third transistor T3 is maintained in a turn-off state, and the sixth transistor T6 is turned off in response to the j-th light emitting control signal Emj. Accordingly, since the first driving voltage ELVDD cannot be transmitted to the second node NB, the potential of the second node NB is gradually decreased and changed to "VREF+Vth." In this case, 'Vth' may be a threshold voltage of the first transistor T1. The second period t12 may be a compensating period in which the potential of the second node NB is compensated by the threshold voltage (Vth) of the first transistor T1. The second period t12 may be made subsequently to the first period t11. The duration of the second period t12 may be greater than the duration of the first period tn.

The potentials of the first and third nodes NA and NC are maintained to the reference voltage VREF through the fourth and fifth transistors T4 and T5 which are turned on, and the potential of the anode of the light emitting element ED is also maintained to the reference voltage VREF through the seventh transistor T7 which is turned on.

Referring to FIGS. 6A to 6C, the (j−1)-th scan signal SCj−1 has a deactivation level for the third period t13 of the write period WP, and the j-th scan signal SCj has an activation level for the third period t13 of the write period WP. The (j−1)-th scan signal SCj−1 may be deactivated earlier than the j-th scan signal SCj by the third period t13. For the third period t13, the fifth transistor T5 is turned off in response to the (j−1)-th scan signal SCj−1, and the second transistor T2, the fourth transistor T4, and the seventh transistor T7 are maintained in the turn-on state. Accordingly, the potential of the first node NA and the potential of the anode of the light emitting element ED are maintained to the reference voltage VREF. The third period t13 may be made subsequently to the second period t12.

For the third period t13 of the write period WP, the (j−1)-th light emitting control signal Emj−1 has an activation level, and the j-th light emitting control signal Emj have a deactivation level. Accordingly, for the third period t13, the sixth transistor T6 is maintained in a turn-off state, and the third transistor T3 is turned on in response to the (j−1)-th light emitting control signal Emj−1. Accordingly, the i-th data signal Di is applied to the third node NC through the third transistor T3 turned on. In other words, the potential of the first node NA for the third period t13 may be the reference voltage VREF, and the potential of the third node NC may be a voltage level Vdata corresponding to the i-th data signal Di. In this case, the voltage level VB of the second node NB may be calculated through a coupling of the first and second capacitors C1 and C2 as in following Equation 1:

$$VB = VREF + Vth + \frac{C1}{C1 + C2}(Vdata - VREF) + Vss. \quad \text{Equation 1}$$

When the duration of the compensating period (that is, the second period t12) is increased, the threshold voltage Vth of the first transistor T1 is sensed at the higher gate-source voltage Vgs. Accordingly, when the data signal Di having the higher grayscale is applied, the difference (that is, the current difference) in the slope of the curve of the drain current Id may be made depending on the characteristic of the first transistor T1 at the threshold voltage Vth or less. However, for the third period t13, the drain current Id having a different magnitude depending on the characteristic of the first transistor T1 may flow out through the seventh transistor T7 turned on. The current (that is, a sink current) flowing out through the seventh transistor T7 may be varied depending on the characteristic of the first transistor T1. Accordingly, as a current difference made at the threshold voltage Vth or less is compensated by the sink current, a voltage Vss corresponding to the current difference of the first transistor T1 may be stored (reflected) at the voltage level VB of the second node NB. Accordingly, the brightness difference resulting from the current difference may be prevented in a higher grayscale region.

The third period t13 may be a programming period for providing the i-th data signal Di.

Referring to FIGS. 7A and 7B, the (j−1)-th scan signal SCj−1 and the j-th scan signal SCj have deactivation levels, for the fourth period t14 of the write period WP. Accordingly, the second, fourth, fifth, and seventh transistors T2, T4, T5, and T7 are turned off for the fourth period t14.

For the fourth period t14 of the write period WP, the (j−1)-th light emitting control signal Emj−1 and the j-th light emitting control signal Emj have activation levels. Accordingly, for the fourth period t14, the third and sixth transistors T3 and T6 are turned on in response to the (j−1)-th light emitting control signal Emj−1 and the j-th light emitting control signal Emj. As the sixth transistor T6 is turned on, the first driving voltage ELVDD is supplied to the second node NB. When the voltage level VB of the second node NB is changed as shown in Equation 1, the voltage level VA of the first node NA is also changed by the voltage change of the second node NB through the coupling of the first capacitor C1.

In other words, the voltage level VA of the first node NA may be calculated as in the following Equation 2:

$$VA = \frac{C1}{C1 + C2}(VREF - Vdata) - Vth - Vss + ELVDD. \quad \text{Equation 2}$$

A driving current flowing to the light emitting element ED through the first transistor T1 may be controlled based on the voltage level VA of the first node NA for the fourth period t14. Accordingly, for the sixth period t16 of the holding period HP, the third and sixth transistors T3 and T6 are turned on in response to the (j−1)-th light emitting control signal Emj−1 and the j-th light emitting control signal Emj. The light emitting current Ted flowing to the light emitting element ED through the first transistor T1 for the sixth period t16 may be controlled based on the voltage level VA of the first node NA. The first transistor T1 may provide the light emitting current Ted corresponding to the voltage level of the first node NA to the light emitting element ED. In other words, the fourth and sixth periods t14 and t16 may be an "emission period" in which the light emitting element ED emits light. The first, second, third, and fifth periods t11, t12, t13, and t15 may correspond to a "non-emission period" in which the light emitting element ED doesn't emit light.

As illustrated through Equation 1, the light emitting current led depends on the threshold voltage Vth of the first transistor T1. The threshold voltage Vth of the first transistor T1 may be varied depending on a position of the pixel PX (see FIG. 1) and may be shifted due to the deterioration of the first transistor T1 over time. In particular, since the change degree (or deterioration degree) in the threshold voltage Vth of the first transistor T1 is varied depending on the pixel PX, the shift degree of the threshold voltage Vth of the first transistor T1 is varied depending on the pixel PX.

As described above with reference to FIGS. 5A and 5B, it is desirable to ensure the sufficiently long time for the second period t12 such that the voltage level VB of the second node NB is sufficiently increased by the threshold voltage Vth of the first transistor T1. According to an embodiment, the duration of the second period t12 is longer than the duration of the third period t13. In particular, as the second period t12 (that is, the compensating period) is sufficiently ensured regardless of the operating frequency, the deviation of the threshold voltage Vth and the variation of the threshold voltage Vth may be sufficiently compensated. In addition, as the seventh transistor T7 is turned on for the third period T13, the voltage Vss corresponding to the current difference at the threshold voltage Vth or less is stored or reflected at the second node NB, thereby compensating for the current difference.

Referring to FIGS. 8A and 8B, when the holding period HP is initiated, the i-th data signal Di may be held at a bias voltage Vb. The bias voltage Vb may be a voltage maintained at a constant voltage level during the holding period HP. According to an embodiment of the present disclosure, the bias voltage Vb may have a voltage level corresponding to a black grayscale, but the present disclosure is not limited thereto. During the holding period HP, the (j−1)-th scan signal SCj−1 and the j-th scan signal SCj are maintained at the deactivation level. Even if the (j−1)-th and j-th light emitting control signals Emj−1 and Emj partially have activation levels for the fifth period t15 of the holding period HP, the (j−1)-th scan signal SCj−1 and the j-th scan signal SCj are maintained at the deactivation levels. Accordingly, since the second, fourth, fifth, and seventh transistors T2, T4, T5, and T7 are turned off for the fifth period t15, the voltage level VA of the first node NA may be constantly maintained.

However, a leakage current may be caused by the fourth transistor T4 during the holding period HP. When the operating frequency is high (for example, 240 Hz and 120 Hz), the change in brightness of the light emitting element ED, which results from the leakage current, is not great. However, when the operating frequency is low (for example, 60 Hz or less), the change in brightness of the light emitting element ED resulting from the leakage current may be viewed by the user.

When the leakage current flows through the fourth transistor T4, the potential of the first node NA may be reduced. When the potential of the first node NA is reduced, the voltage of the gate electrode of the first transistor T1 is changed. Accordingly, the light emitting current Ted flowing to the light emitting element ED through the first transistor T1 may be varied. The change of the light emitting current Ted flowing to the light emitting element ED changes the brightness, and the change in brightness is viewed as the flicker phenomenon by a user.

According to an embodiment of the present disclosure, the reference voltage VREF may be gradually increased to a level (for example, the target level Vt) higher than the reference level Vr (e.g., the target level Vt) and then may be decreased for the holding period HP. When the reference voltage VREF is increased higher than the reference level Vr, an amount of current leaked through the fourth transistor T4 may be decreased. Accordingly, the decrement of the potential of the first node NA may be reduced. In addition, when the reference voltage VREF has a voltage level higher than the potential of the first node NA, the leakage current may flow in the opposite direction. In this case, the reduced potential of the first node NA may be increased. As described above, when the voltage level of the reference voltage VREF is changed to a level higher than the reference level Vr during the holding period HP, the change in potential of the first node NA in a low-frequency operation may prevent the phenomenon viewed as a flicker phenomenon.

Although FIGS. 4A to 8B illustrate the structure in which the reference voltage VREF is varied during the holding period HP, the present disclosure is not limited thereto. Alternatively, the reference voltage VREF may be maintained at the reference level Vr, instead of being varied during the holding period HP.

Figure 9:
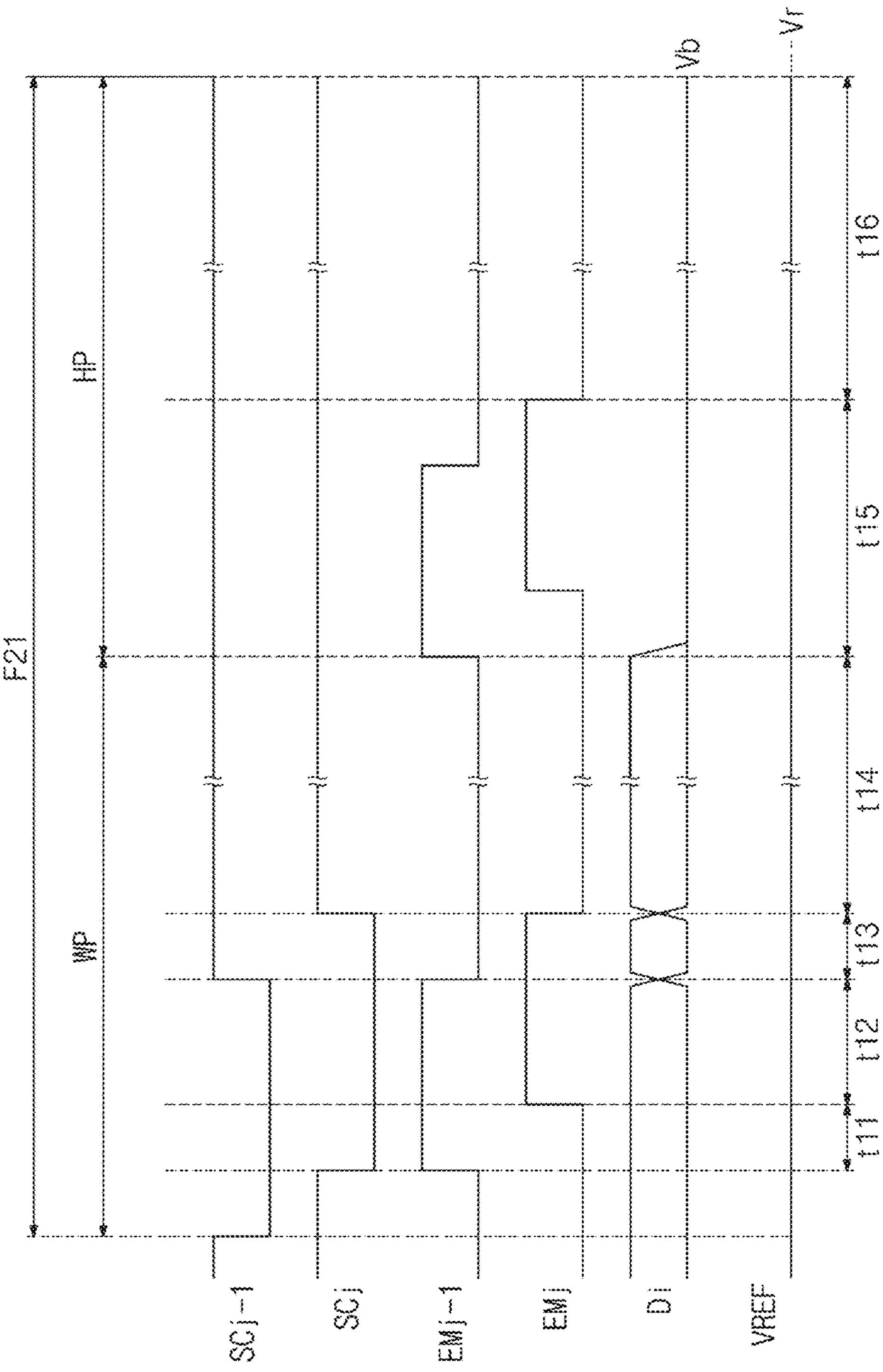
FIG. 9 is a waveform view illustrating a reference voltage according to an embodiment of the present disclosure.

FIG. 9 is a waveform illustrating a reference voltage according to an embodiment of the present disclosure.

Referring to FIG. 9, the reference voltage VREF may be maintained at the reference level Vr instead of being varied during the holding period HP. When the reference voltage VREF is maintained at the reference level Vr during the holding period HP, the performance for improving the flicker phenomenon may be more deteriorated, when compared with the structure in which the reference voltage VREF is varied. However, when each pixel PX (see FIG. 1) employs the circuit structure illustrated in FIG. 2, the potential of the first node NA may be stably maintained. In particular, even when the display device DD is driven by fixing the frequency to a specific frequency rather than in a driving mode in which the operating frequency is varied, the structure of the pixel PX may stably maintain the potential of the first node NA by minimizing the leakage current pass.

Figure 10:
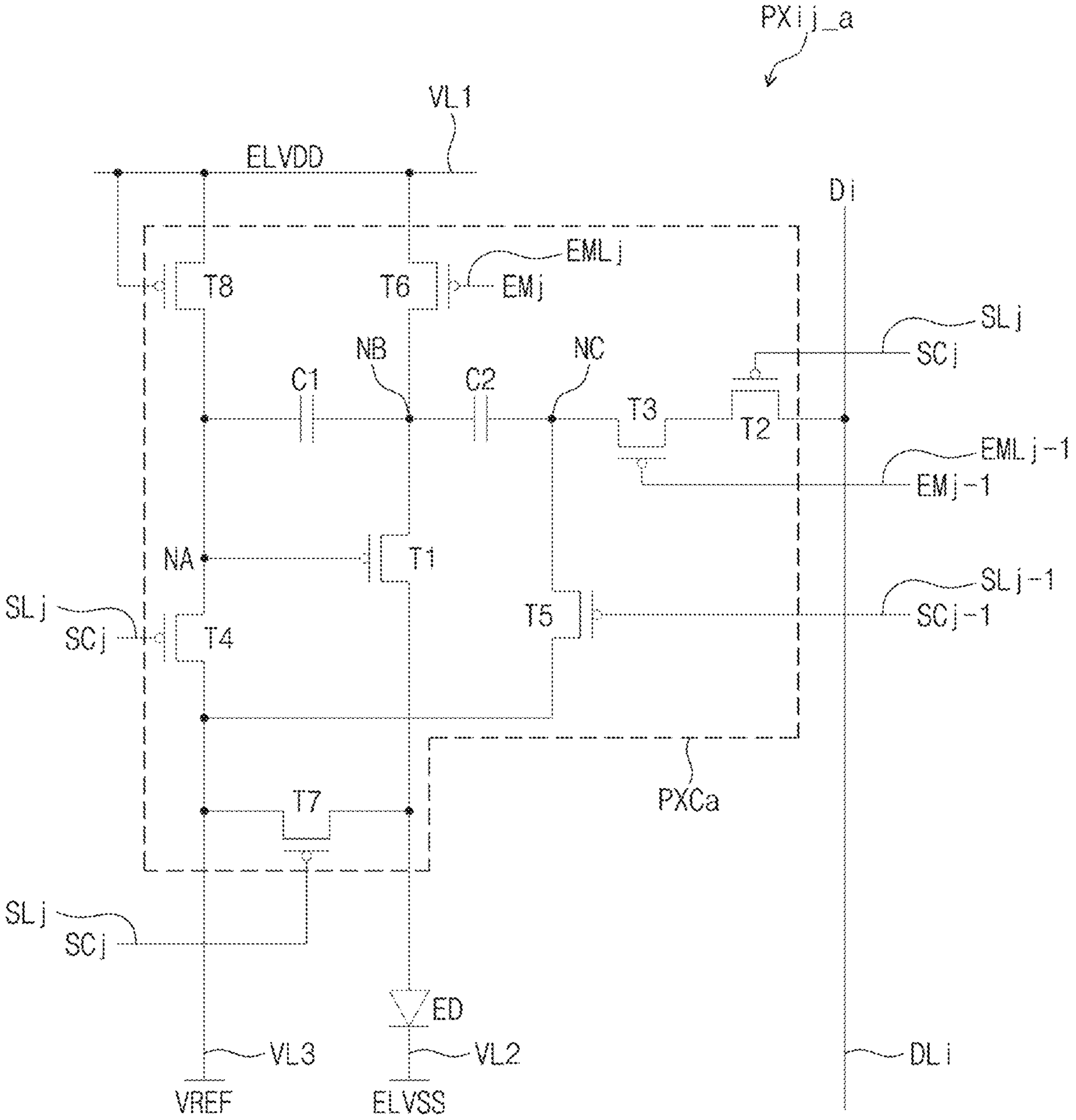
FIG. 10 is a circuit diagram of a pixel according to another embodiment of the present disclosure.

FIG. 10 is a circuit diagram of a pixel according to another embodiment of the present disclosure. However, the same reference numerals are assigned to the same components as those illustrated in FIG. 2 among the components illustrated in FIG. 10, and the details thereof will be omitted to avoid redundancy.

Referring to FIG. 10, a pixel Pxij a includes a pixel circuit unit PXCa and the light emitting element ED. The pixel circuit unit PXCa may include eight transistors and two capacitors. Hereinafter, the eight transistors are referred to as first to eighth transistors T1, T2, T3, T4, T5, T6, T7, and T8, and the two capacitors are referred to as first and second capacitors C1 and C2.

When compared with the pixel circuit unit PXC illustrated in FIG. 2, the pixel circuit unit PXCa according to the present embodiment further includes the eighth transistor T8. The eighth transistor T8 is diode-connected between the first voltage line VL1 and the first node NA. The eighth transistor T8 maintains a turn-off state while the first driving voltage ELVDD is supplied through the first voltage line VL1.

As illustrated in FIGS. 7B and 10, the leakage current may be caused (hereinafter, the first leakage current pass) due to the fourth transistor T4 for the fourth period t14. When the operating frequency is high (for example, 240 Hz and 120 Hz), the change in brightness of the light emitting element ED resulting from the leakage current is not great. However, when the operating frequency is low (for example, 60 Hz or less), the change in brightness of the light emitting element ED resulting from the leakage current may be viewed by the user.

When the eighth transistor T8 is additionally connected to the first node NA, the leakage current may flow through the eighth transistor T8 for the fourth period t14 (hereinafter, a second leakage current pass). The second leakage current pass may be formed in a direction opposite to the direction of the first leakage current pass. In other words, the first and second leakage current passes may be formed to be cancelled from each other. Accordingly, even if the leakage current is made, the voltage level VA of the first node NA may be stably maintained, and the change in brightness resulting from the leakage current may be prevented from being viewed as a flickering phenomenon.

In a structure in which the eighth transistor T8 is added, the reference voltage VREF may be maintained at the reference level Vr without being changed during the holding period HP (see FIG. 9). However, the present disclosure is not limited thereto. Even in a structure in which the eighth transistor T8 is added, the reference voltage VREF may be varied to a level different from the reference level Vr during the holding period HP.

Figure 11:
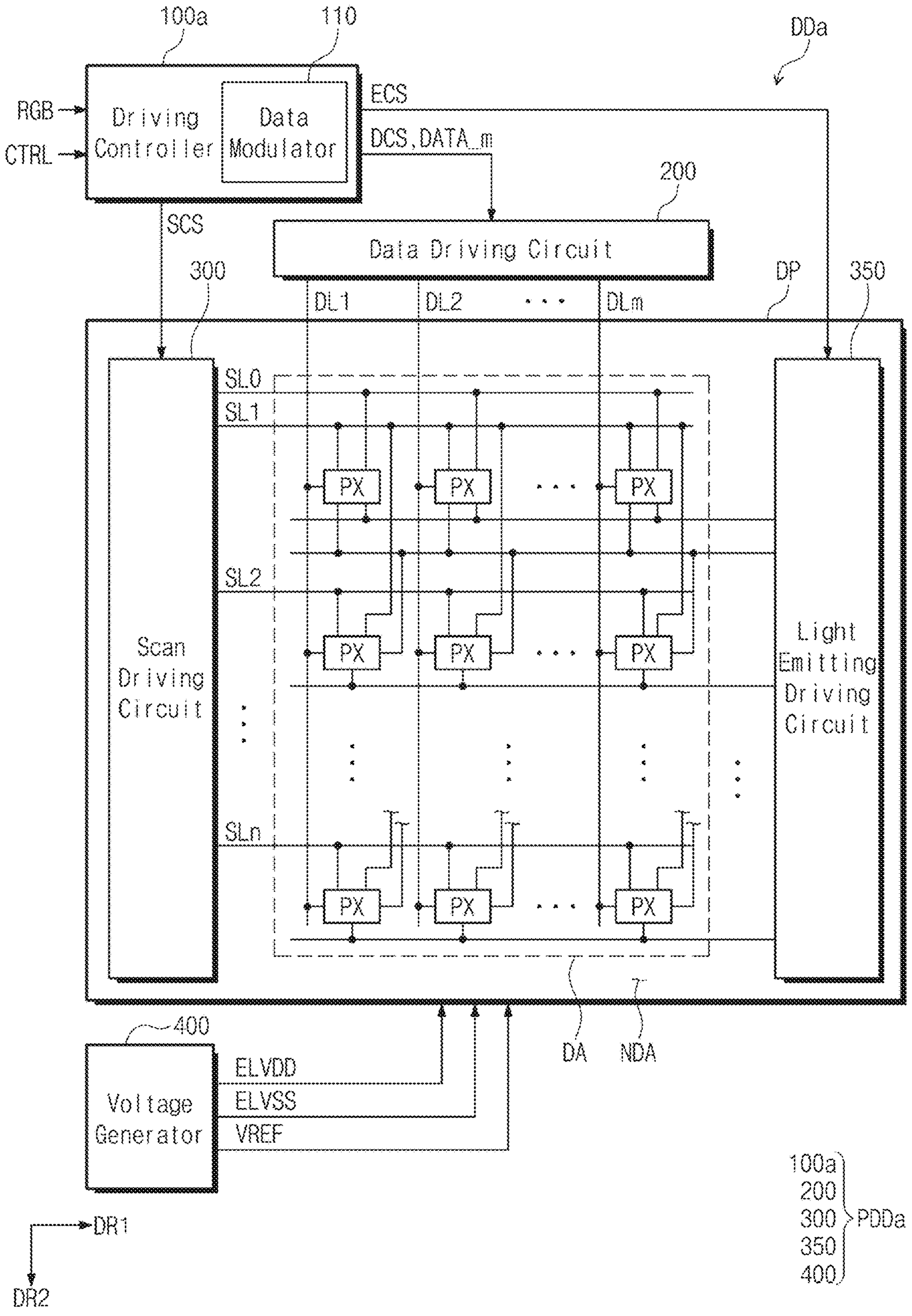
FIG. 11 is a block diagram of a display device according to another embodiment of the present disclosure.
Figure 12:
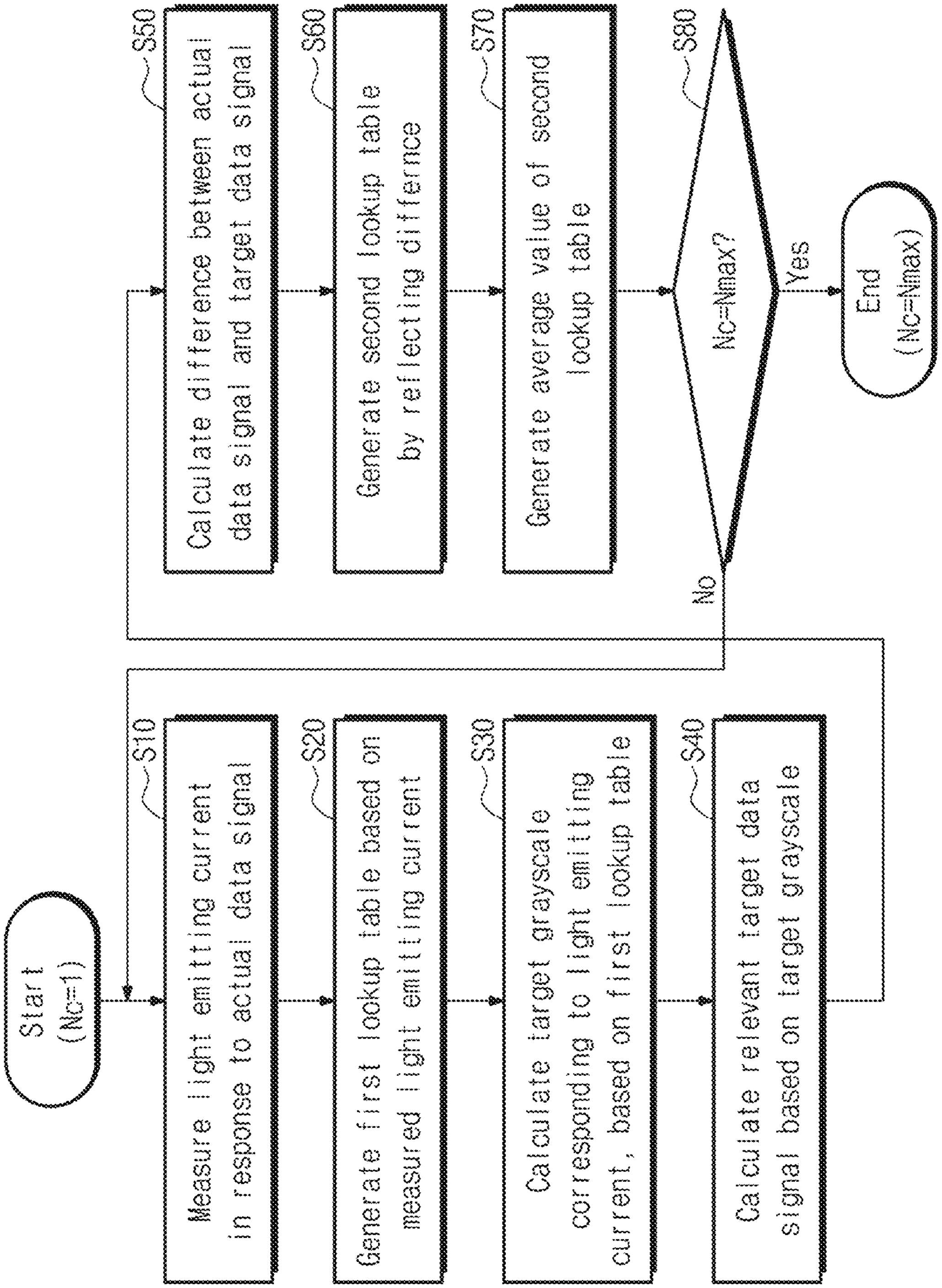
FIG. 12 is a flowchart illustrating an operating procedure of a data modulator illustrated in FIG. 11.

FIG. 11 is a block diagram of a display device according to another embodiment of the present disclosure, and FIG. 12 is a flowchart illustrating the operating procedure of a data modulator illustrated in FIG. 11. However, the same reference numerals are assigned to the same components as those illustrated in FIG. 1 among the components illustrated in FIG. 11, and the details thereof will be omitted to avoid redundancy.

Referring to FIG. 11, according to an embodiment of the present disclosure, a display device DDa includes the display panel DP, and a panel driver PDDa to drive the display panel DP. According to an embodiment of the present disclosure, the panel driver PDDa may include a driving controller 100*a*, the data driving circuit 200, the scan driving circuit 300, the light emitting driving circuit 350, and the voltage generator 400.

The driving controller 100*a* receives the image signal RGB and the control signal CTRL. The driving controller 100*a* generates image data DATA_m by transforming a data format of the image signal RGB to be matched to the interface specification of the data driving circuit 200. According to an embodiment of the present disclosure, the driving controller 100*a* further includes a data modulator 110. The data modulator 110 may measure a light emitting current Ted (see FIG. 7A) for each operating frequency selected from a plurality of pixels PX, and may modulate image data using a difference between the measured light emitting current Ied and the target current to output modulated image data DATA_m.

The data driving circuit 200 receives the modulated image data DATA_m and transforms the received image data DATA_m into a data signal.

Accordingly, since a data signal based on the modulated image data DATA_m is applied to each pixel PX, each pixel PX may show the brightness corresponding to the target current, thereby reducing the brightness difference between operating frequencies.

Referring to FIG. 12, the data modulator 110 may perform a sampling operation of measuring a light emitting current Ied (see FIG. 7A) by a preset number of times.

When the measurement is initiated, the number Nc of sampling operations may be counted. The actual data signal Di is applied to the sample pixels to measure the light emitting current Ted of each sample pixel (S10). The first lookup table may be generated based on the measured light emitting current Ied (S20). For example, the first lookup table may be generated based on the light emitting current led measured depending on the gray scale (i.e., actual grayscale) of the data signal applied to each sample pixel. The target grayscale corresponding to the target current may be calculated based on the first lookup table (S30). The corresponding target data signal may be calculated based on the target grayscale (S40). Thereafter, the difference between the target data signal and the actual data signal may be calculated (S50), and the second lookup table may be generated by reflecting the difference (S60). Data stored in second lookup tables may be updated to an average value, whenever the number of sampling is increased (S70).

Thereafter, it is determined whether the number Nc of sampling operations is equal to the preset maximum number Nmax (S80). When the number Nc of sampling operations is not equal to the preset maximum number Nmax, the operation moves to step S10 and operations are repeated. When the number Nc of sampling operations is equal to the preset maximum number Nmax, the sampling operation may be terminated.

Referring back to FIG. 11, the data modulator 110 may modulate image data based on the second lookup table generated through the sampling operation, thereby generating the modulated image data DATA_m. Accordingly, as the operating frequency is varied, the current difference generated in each pixel PX may be improved through modulation of the image data.

Figure 13A:
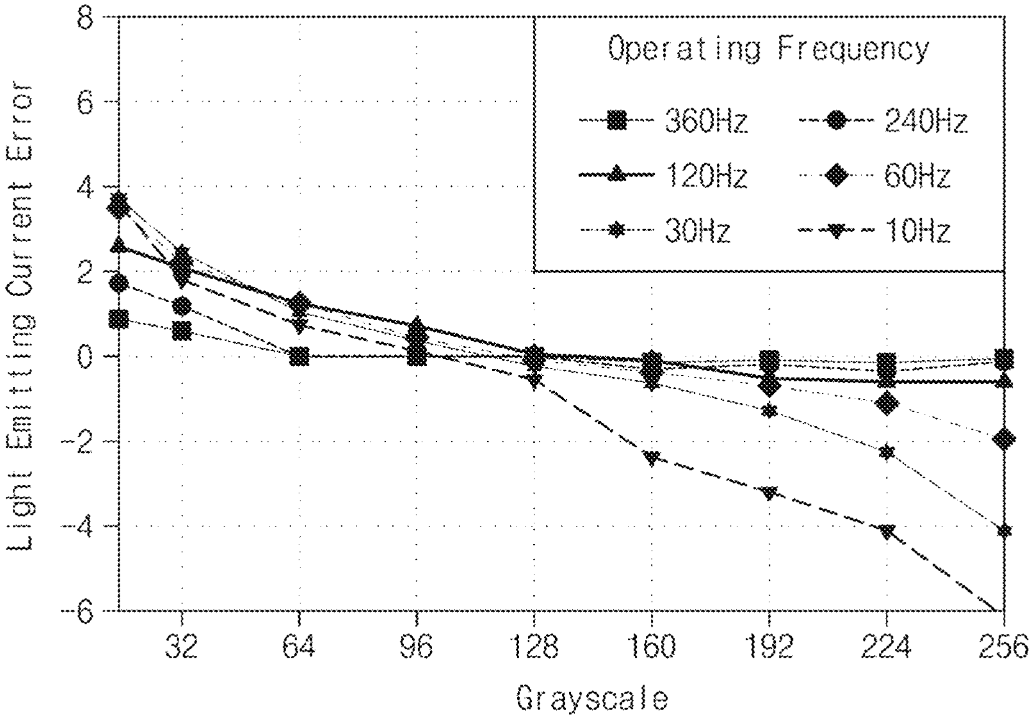
FIGS. 13A to 13C are graphs illustrating light emitting current errors for each operating frequency according to an embodiment of the present disclosure.
Figure 13B:
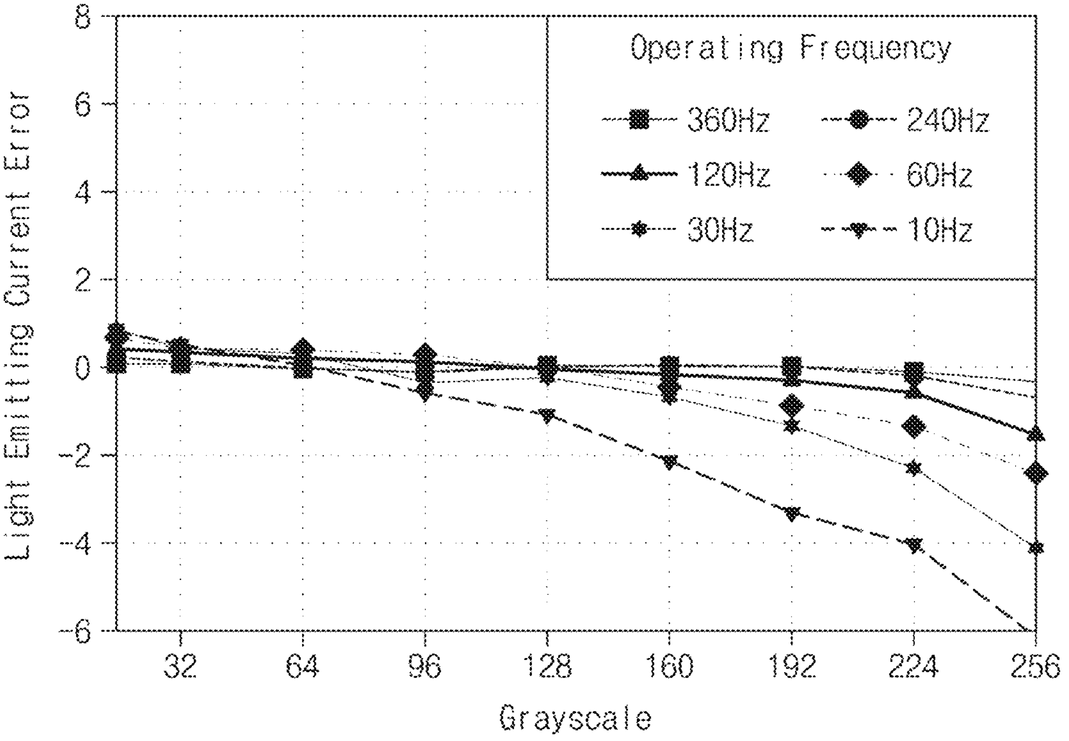
Figure 13C:
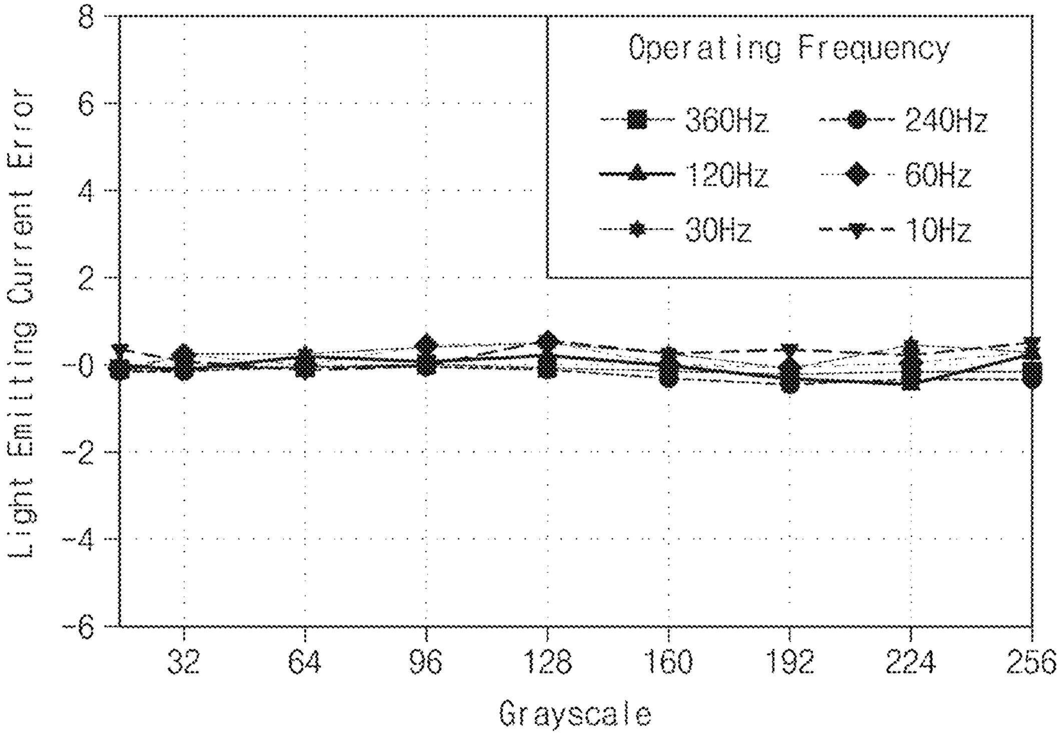

FIG. 13A is a graph illustrating a light emitting current error at a low grayscale when a reference voltage is not varied as illustrated in FIG. 9. FIG. 13B is a graph illustrating a light emitting current error at a low grayscale, when the reference voltage is varied as illustrated in FIGS. 4A to 8B. FIG. 13C is a graph illustrating a light emitting current error in a low grayscale when a data voltage is modulated depending on an operating frequency as illustrated in FIGS. 11 and 12.

Referring to FIGS. 9 and 13A, when the operating frequencies are 360 Hz, 240 Hz, 120 Hz, 60 Hz, 30 Hz, and 15 Hz, a light emitting current error for each grayscale is caused. As the operating frequency is decreased, the light emitting current error for each grayscale is increased. When the reference voltage VREF is maintained at the reference level Vr without being changed for the holding period HP, as the operating frequency is decreased, the light emitting current error is increased in the lower grayscale region and the higher grayscale region.

Referring to FIGS. 7B and 13B, when the reference voltage VREF is not maintained at the reference level Vr and is varied within a range between the reference level Vr and the target level Vt during the holding period HP, the light emitting current error is decreased in the lower grayscale region. In other words, in an embodiment, even if the operating frequency is decreased, the light emitting current error is not increased in the lower grayscale region.

Referring to FIGS. 12 and 13C, when the image data is modulated through the data modulator 110, in the state that the reference voltage VREF is varied for the holding period HP, the light emitting current error is decreased in the higher grayscale region. In other words, even if the operating frequency is decreased, the light emitting current error is not increased in the higher grayscale region. As the light emitting current error is hardly made in the whole grayscale region, even if the operating frequency is varied, the flicker phenomenon is not viewed due to the difference in brightness. Accordingly, the display quality may be improved.

According to the present disclosure, the compensating period may be sufficiently ensured to compensate for the difference or the change in threshold voltage of the first transistor even in the higher-speed operation. Accordingly, when the lower grayscale image is displayed at the higher operating frequency, the difference in current provided to the light emitting element may be effectively minimized. In addition, when the higher grayscale image is displayed, the current difference made at the threshold voltage or less during the programming period is compensated through the sink current. Accordingly, the brightness difference resulting from the current difference may be effectively prevented.

In addition, as the potential of the first node is stably maintained even at the lower operating frequency, the brightness difference may be prevented with respect to each operating frequency, and the brightness difference is prevented from being viewed as the flicker phenomenon, thereby effectively improving the whole display quality.

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel including a pixel; and a panel driver configured to drive the display panel, wherein the pixel includes:

a light emitting element;

a first capacitor including a first electrode connected to a first node and a second electrode connected to a second node;

a second capacitor including a first electrode connected to the second node and a second electrode connected to a third node;

a first transistor including a first electrode connected to the second node, a second electrode connected to the light emitting element, and a gate electrode connected to the first node;

a second transistor connected between the second electrode of the second capacitor and a data line, and configured to operate depending on a first scan signal provided from the panel driver;

a third transistor connected between the second electrode of the second capacitor and the second transistor, and configured to operate depending on a first light emitting control signal provided from the panel driver;

a fourth transistor connected between a reference voltage line, which is to receive a reference voltage, and the first electrode of the first capacitor, and configured to operate depending on a second scan signal provided from the panel driver; and a fifth transistor connected between the reference voltage line and the second electrode of the second capacitor, and configured to operate depending on a third scan signal provided from the panel driver, wherein the second scan signal has an activation level for a first period, and the first light emitting control signal has a deactivation level for the first period.

2. The display device of claim 1, wherein the pixel further includes:

a sixth transistor connected between a first voltage line, which is to receive a first driving voltage, and the second node, and configured to operate depending on a second light emitting control signal; and a seventh transistor connected between the reference voltage line and the light emitting element, and configured to operate depending on a fourth scan signal.

3. The display device of claim 2, wherein the first scan signal, the second scan signal, the third scan signal, and the fourth scan signal have the activation level for the first period, the first light emitting control signal has the deactivation level for the first period, and the second light emitting control signal has the activation level for the first period.

4. The display device of claim 3, wherein the first scan signal, the second scan signal, the third scan signal, and the fourth scan signal have the activation level for a second period subsequent to the first period, and the first light emitting control signal and the second light emitting control signal has the deactivation level for the second period, and wherein a duration of the second period is longer than a duration of the first period.

5. The display device of claim 4, wherein the first scan signal, the second scan signal, and the fourth scan signal have the activation level for a third period subsequent to the second period, the third scan signal has the deactivation level for the third period, the first light emitting control signal has the activation level for the third period, and the second light emitting control signal has the deactivation level for the third period.

6. The display device of claim 5, wherein the first scan signal, the second scan signal, and the fourth scan signal are a same signal, wherein the third scan signal is activated earlier than the first scan signal, the second scan signal, and the fourth scan signal, by a duration of the first period, and wherein the first light emitting control signal is deactivated earlier than the second light emitting control signal by a duration of the third period.

7. The display device of claim 2, wherein the pixel further includes:

an eighth transistor diode-connected between the first voltage line and the first node.

8. The display device of claim 2, wherein the light emitting element is connected between a second voltage line, which is to receive a second driving voltage, and the first transistor.

9. The display device of claim 2, wherein the display panel displays an image during a plurality of frames, wherein at least one frame of the plurality of frames includes a write period and a holding period, wherein the first scan signal, the second scan signal, and the third scan signal have an activation level within the write period, and has a deactivation level during the holding period, and wherein the first light emitting control signal and the second light emitting control signal has the activation level within the write period and the holding period.

10. The display device of claim 9, wherein the reference voltage has a reference level during the write period, and is varied to be in a level higher than the reference level within the holding period.

11. The display device of claim 10, wherein the reference voltage is varied in a level range higher than the reference level during the holding period and lower than the first driving voltage during the holding period.

12. The display device of claim 9, wherein the reference voltage has a reference level during the write period, and is maintained to the reference level during the holding period.

13. The display device of claim 1, wherein the panel driver includes:

a scan driving circuit configured to output the first scan signal, the second scan signal, and the third scan signal; and a light emitting driving circuit configured to output the first light emitting control signal, and wherein the light emitting driving circuit operates at a frequency equal to or higher than a frequency of the scan driving circuit.

14. The display device of claim 13, wherein the panel driver further includes:

a voltage generator configured to adjust a voltage level of the reference voltage depending on an operating frequency of the scan driving circuit.

15. A display device comprising:

a display panel including a pixel; and a panel driver configured to drive the display panel, wherein the pixel includes:

a light emitting element;

a first capacitor connected between a first node and a second node;

a second capacitor connected between the second node and a third node;

a first transistor connected between the second node and the light emitting element, and configured to operate depending on potential of the first node;

a second transistor connected between the third node and a data line, and configured to operate depending on a first scan signal provided from the panel driver;

a third transistor connected between the third node and the second transistor, and configured to operate depending on a first light emitting control signal provided from the panel driver;

a fourth transistor connected between a reference voltage line, which is to receive a reference voltage, and the first node, and configured to operate depending on a second scan signal provided from the panel driver; and a fifth transistor connected between the reference voltage line and the third node, and configured to operate depending on a third scan signal provided from the panel driver, wherein the first scan signal, the second scan signal, and the third scan signal have an activation level for a first period, and wherein the first light emitting control signal has a deactivation level for the first period.

16. The display device of claim 15, wherein the first scan signal is a same signal as the second scan signal, and wherein the third scan signal is activated earlier than the first scan signal and the second scan signal, by a duration of the first period.

17. A display device comprising:

a display panel including a pixel; and a panel driver configured to drive the display panel, wherein the pixel includes:

a light emitting element;

a first capacitor connected between a first node and a second node;

a second capacitor connected between the second node and a third node;

a first transistor connected between the second node and the light emitting element, and configured to operate depending on potential of the first node;

a second transistor connected between the third node and a data line, and configured to operate depending on a first scan signal provided from the panel driver; and a fourth transistor connected between a reference voltage line, which is to receive a reference voltage, and the first node, and configured to operate depending on a second scan signal provided from the panel driver, wherein the display panel displays an image during a plurality of frames, and at least one frame of the plurality of frames includes a write period and a holding period, and wherein the reference voltage has a reference level during the write period, and is varied to be in a level higher than the reference level within the holding period.

18. The display device of claim 17, wherein the pixel further includes:

a third transistor connected between the third node and the second transistor, and configured to operate depending on a first light emitting control signal provided from the panel driver;

a fifth transistor connected between the reference voltage line and the third node, and configured to operate depending on a third scan signal provided from the panel driver; and a sixth transistor connected between a first voltage line, which is to receive a first driving voltage, and the second node, and configured to operate depending on a second light emitting control signal.

19. The display device of claim 18, wherein the reference voltage is varied in a level range higher than the reference level during the holding period and lower than a level of the first driving voltage during the holding period.

20. The display device of claim 17, wherein the first scan signal, and the second scan signal have an activation level within the write period, and has a deactivation level during the holding period.

21. A method for driving a display device including a display panel including a pixel connected to a reference voltage line which is to receive a reference voltage, and a panel driver which drives the display panel during a plurality of frames, at least one frame of which includes a write period and a holding period, the method comprising:

applying, to the pixel, a scan signal having an activation level within a non-emission period of the write period;

applying, to the pixel, a light emitting control signal having the activation level within an emission period of the write period; and deactivating the scan signal within the holding period, and applying the light emitting control signal to the pixel within the emission period of the holding period, wherein the reference voltage has a reference level during the write period, and is varied to be in a level higher than the reference level during the holding period.

22. The method of claim 21, wherein the pixel includes:

a light emitting element;

a first capacitor connected between a first node and a second node;

a second capacitor connected between the second node and a third node;

a first transistor connected between the second node and the light emitting element, and configured to operate depending on potential of the first node;

a second transistor connected between the third node and a data line, and configured to operate depending on a first scan signal of the scan signal; and a fourth transistor connected between the reference voltage line and the first node, and configured to operate depending on a second scan signal of the scan signal.

23. The method of claim 22, wherein the pixel further includes:

a third transistor connected between the third node and the second transistor, and configured to operate depending on a first light emitting control signal of the light emitting control signal;

a fifth transistor connected between the reference voltage line and the third node, and configured to operate depending on a third scan signal of the scan signal; and a sixth transistor connected between a first voltage line, which is to receive a first driving voltage, and the second node, and configured to operate depending on a second light emitting control signal of the light emitting control signal.

24. The method of claim 23, wherein the reference voltage is varied in a level range higher than the reference level and lower than a level of the first driving voltage during the holding period.

25. The method of claim 23, wherein the first scan signal, the second scan signal, and the third scan signal have an activation level within the write period, and has a deactivation level during the holding period, and wherein the first light emitting control signal and the second light emitting control signal have the activation level during the write period and the holding period.

26. The method of claim 21, wherein a total number of holding periods included in each of the at least one frame is adjusted depending on an operating frequency of the display panel.

27. The method of claim 26, wherein the pixel is provided in plurality, and wherein the method further includes:

measuring a light emitting current at the operating frequency with respect to sample pixels selected from the plurality of pixels;

modulating image data by using a difference between the measured light emitting current and a preset target current corresponding to the operating frequency, and generating a data signal based on the modulated image data; and applying the data signal to a relevant pixel of the plurality of pixels, within the non-emission period of the write period.

* * * * *